US007765377B2

(12) United States Patent
Friauf et al.

(10) Patent No.: US 7,765,377 B2

(45) Date of Patent: Jul. 27, 2010

(54) APPARATUS AND METHOD TO WRITE INFORMATION TO ONE OR MORE INFORMATION STORAGE MEDIA

(75) Inventors: Cheryl M. Friauf, Tucson, AZ (US); Gregory T. Kishi, Oro Valley, AZ (US); Jonathan W. Peake, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1564 days.

(21) Appl. No.: 10/431,728

(22) Filed: May 8, 2003

(65) Prior Publication Data

US 2004/0225854 A1 Nov. 11, 2004

(51) Int. Cl.
*G06F 7/76* (2006.01)

(52) U.S. Cl. ..................................................... 711/170

(58) Field of Classification Search ................ 711/170, 711/112; 707/204

See application file for complete search history.

(56) References Cited

U.S. PATENT DOCUMENTS

| | | | | |
|---|---|---|---|---|
| 5,247,638 | A | 9/1993 | O'Brien et al. | 395/425 |
| 5,394,534 | A * | 2/1995 | Kulakowski et al. | 711/112 |
| 5,463,772 | A | 10/1995 | Thompson et al. | 395/600 |
| 5,490,260 | A | 2/1996 | Miller et al. | 395/427 |
| 5,561,824 | A * | 10/1996 | Carreiro et al. | 710/52 |
| 5,630,092 | A | 5/1997 | Carreiro et al. | 395/438 |
| 5,675,789 | A * | 10/1997 | Ishii et al. | 707/204 |
| 5,682,499 | A | 10/1997 | Bakke et al. | 395/439 |
| 5,778,411 | A | 7/1998 | DeMoss et al. | 711/4 |
| 6,000,009 | A | 12/1999 | Brady | 711/112 |
| 6,058,462 | A | 5/2000 | West et al. | 711/162 |
| 6,170,037 | B1 | 1/2001 | Blumenau | 711/114 |
| 6,317,747 | B1 | 11/2001 | Bolan et al. | 707/101 |
| 6,324,497 | B1 | 11/2001 | Yates et al. | 703/24 |
| 6,324,621 | B2 * | 11/2001 | Singh et al. | 711/129 |
| 6,446,175 | B1 * | 9/2002 | West et al. | 711/162 |
| 2001/0001872 | A1 | 5/2001 | Singh et al. | 711/129 |
| 2001/0047461 | A1 * | 11/2001 | Milillo et al. | 711/162 |
| 2002/0083238 | A1 | 6/2002 | Naka et al. | 710/68 |

OTHER PUBLICATIONS

International Business Machines Corporation, "z/OS V1R3 DFSMS Introduction", 1980, 2002, pp. 1-140.

* cited by examiner

*Primary Examiner*—Tuan V Thai
*Assistant Examiner*—Duc T Doan
(74) *Attorney, Agent, or Firm*—Dale F. Regelman; Quarles & Brady LLP

(57) ABSTRACT

A method to write information to one or more information storage media disposed in a data storage and retrieval system comprising host adapters capable of data compression and information storage devices capable of data compression. The method establishes a storage medium usage threshold and determines the actual storage media usage level for the data storage and retrieval system. The method then determines if the actual storage media usage level is greater than the storage medium usage threshold. If the actual storage media usage level is greater than said storage medium usage threshold, then the method enables use of information storage device data compression. Alternatively, if the actual storage media usage level is not greater than said storage medium usage threshold, then the method disables use of information storage device data compression.

27 Claims, 16 Drawing Sheets

| | Drive Compression only | Adapter Compression and Drive Compression | Adapter Compression with no Drive Compression |
|---|---|---|---|
| Volume Size at Host | | | |
| Volume Size in VTS Cache | | | |
| Volume Size in VTS Backstore (on tape) | | | |

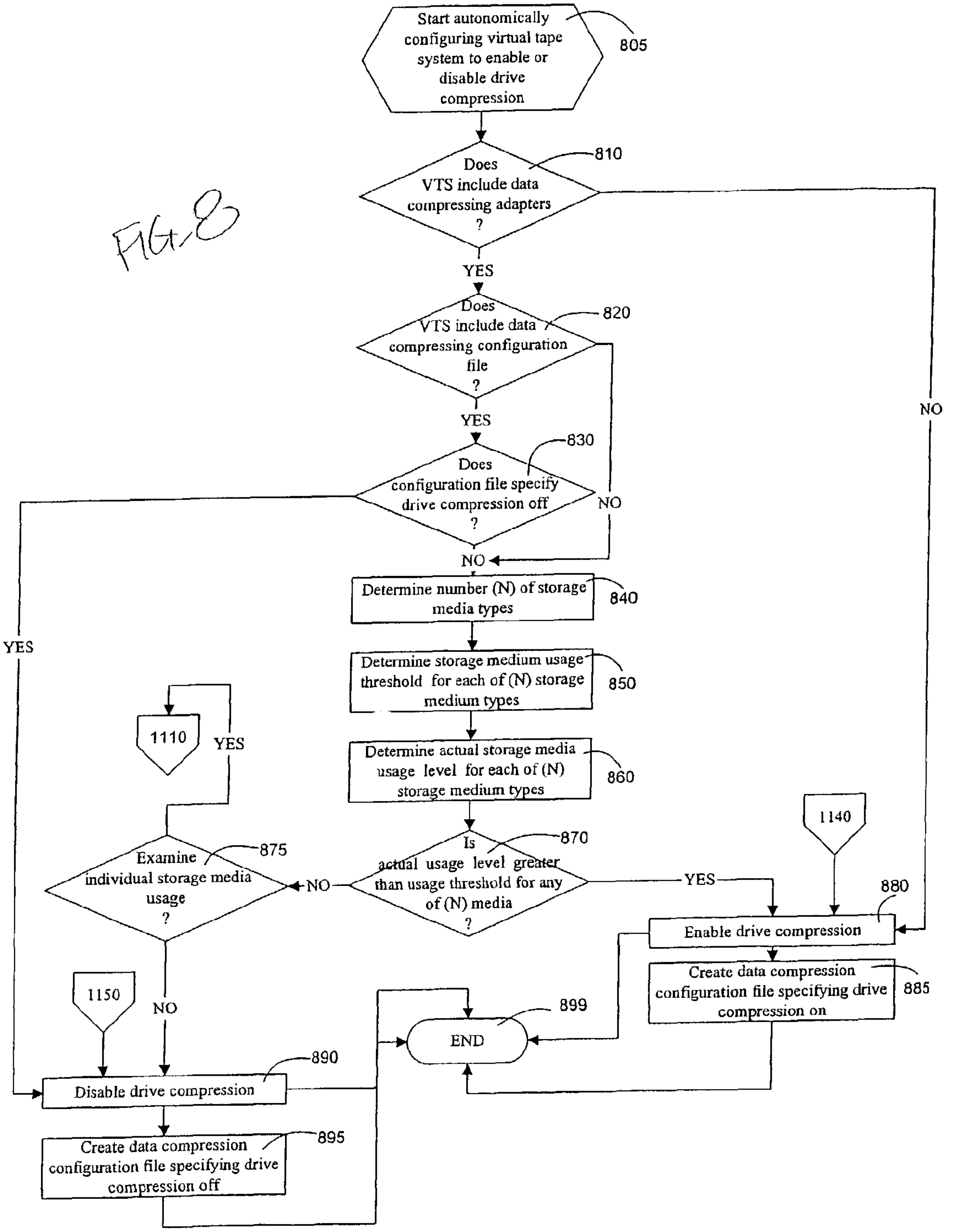
FIG. 8
Start autonomically configuring virtual tape system to enable or disable drive compression
805
Does VTS include data compressing adapters ?
810
YES
NO
Does VTS include data compressing configuration file ?
820
YES
NO
Does configuration file specify drive compression off ?
830
YES
NO
Determine number (N) of storage media types
840
Determine storage medium usage threshold for each of (N) storage medium types
850
Determine actual storage media usage level for each of (N) storage medium types
860
Is actual usage level greater than usage threshold for any of (N) media ?
870
YES
NO
Examine individual storage media usage ?
875
1110
YES
NO
1150
1140
Enable drive compression
880
Create data compression configuration file specifying drive compression on
885
END
899
Disable drive compression
890
Create data compression configuration file specifying drive compression off
895

APPARATUS AND METHOD TO WRITE INFORMATION TO ONE OR MORE INFORMATION STORAGE MEDIA

FIELD OF THE INVENTION

Applicant's invention relates to an apparatus and method to write information to one or more information storage media contained in a data storage and retrieval system. In certain embodiments, Applicants' invention relates to an apparatus and method to write information to one or more portable tape storage media in a virtual tape system.

BACKGROUND OF THE INVENTION

In hierarchical computer storage systems, intensely used and fast storage are paired with arrays of slower and less frequently accessed data devices. One example of high-speed, expensive memory is a direct access storage device file buffer (DASD). Slower storage devices include tape drives and disk drive arrays, which are less expensive than a DASD.

One such hierarchical storage system is a virtual tape storage system. Such a virtual tape storage system may include, for example, one or more virtual tape servers in combination with one or more data storage and retrieval systems, such as the IBM TotalStorage® 3494 Enterprise Tape Library. During operation, the virtual tape storage system is writing data from a host to the numerous data storage devices contained in the one or more data storage and retrieval systems.

Automated data storage and retrieval systems are known for providing cost effective access to large quantities of stored media. Generally, a data storage and retrieval system includes a large number of storage slots on which are stored portable data storage media. The typical portable data storage media is a tape cartridge, an optical cartridge, a disk cartridge, electronic storage media, and the like. By electronic storage media, Applicants mean a device such as a PROM, EPROM, EEPROM, Flash PROM, and the like.

One (or more) accessors typically accesses the data storage media from the storage slots and delivers the accessed media to a data storage device for reading and/or writing data on the accessed media. Suitable electronics operate the accessor(s) and operate the data storage device(s) to provide information to, and/or to receive information from, an attached on-line host computer system.

SUMMARY OF THE INVENTION

Applicants' invention includes a method and apparatus to write information to one or more information storage media disposed in a data storage and retrieval system. That data storage and retrieval system includes one or more information storage devices comprising one or more data compression algorithms. In certain embodiments, these one or more information storage media comprise portable tape cartridges disposed in a virtual tape storage system.

Applicant's method establishes a storage medium usage threshold, and determines an actual storage media usage level. Applicants' method then determines if the actual storage media usage level is greater than the storage medium usage threshold. If the actual storage media usage level is greater than said storage medium usage threshold, then Applicants' method enables use of the one or more data compression algorithms. Alternatively, if the actual storage media usage level is not greater than said storage medium usage threshold, then Applicants' method disables use of the one or more data compression algorithms.

BRIEF DESCRIPTION OF THE DRAWINGS

The invention will be better understood from a reading of the following detailed description taken in conjunction with the drawings in which like reference designators are used to designate like elements, and in which:

FIG. 8 summarizes the steps of one embodiment of Applicants' method to write information to one or more information storage media;

DETAILED DESCRIPTION OF THE PREFERRED EMBODIMENTS

Referring to the illustrations, like numerals correspond to like parts depicted in the figures. The invention will be described as embodied in a virtual tape server in combination with an automated data storage and retrieval subsystem for use in a data processing environment. The following description of Applicant's apparatus and method is not meant, however, to limit Applicant's invention to either virtual tape storage systems, or to data processing applications, as the invention herein can be applied to information storage in general.

Figure 3:
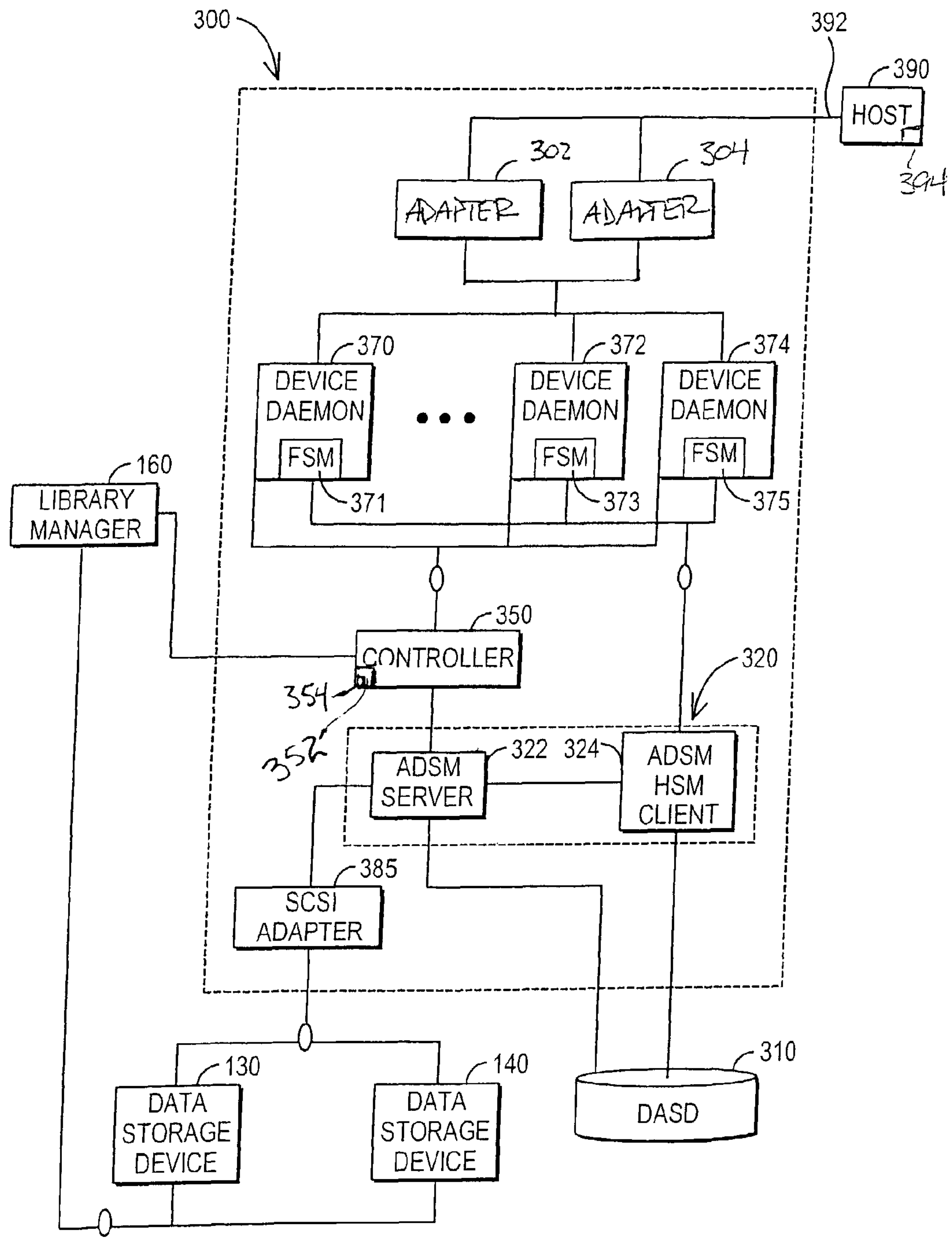
FIG. 3 is a block diagram showing the components of Applicants' virtual tape system.

FIG. 3 illustrates the hardware and software environment in which preferred embodiments of the present invention are implemented. Virtual tape server (VTS) 300 is pictured, operatively coupled to a host computer 390. In certain embodiments, host computer 390 comprises a single computer. In alternative embodiments, host computer 390 comprises one or more mainframe computers, one or more work stations, one or more personal computers, combinations thereof, and the like.

Host computer 390 communicates with VTS 300 via communication link 392 with one or more host adapters, such as adapters 302 and 304 disposed within the virtual tape server 300. Communication link 392 comprises a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof. In certain embodiments, the one or more host adapters comprise one or more IBM Enterprise Systems Connection (ESCON) adapter. In certain embodiments, the one or more host adapters comprise one or more IBM Fibre Connection (FICON) adapter. In certain embodiments, communication link 392 comprises a fiber optic local area network used to link mainframes to disk drives or other mainframes.

In certain embodiments, host adapters 302 and 304 are capable of data compression. In these embodiments, host adapters 302 and 304 contain data compression algorithms. As those skilled in the art will appreciate, such data compression algorithms generate second information which represents source data, i.e. first information, accurately using the fewest number of bits. In certain embodiments, adapters 302/304 are capable of data compression having a data compression ratio of about 4:1. In certain embodiments, adapters 302/304 are capable of data compression having a data compression ratio greater than about 4:1. In certain embodiments, a host computer, such as host 390, can enable or disable data compression by adapters 302 and 304. In certain embodiments, the VTS, such as VTS 300, can enable or disable data compression by adapters 302 and 304.

VTS 300 also communicates with direct access storage device (DASD) 310, a plurality of data storage devices 130/140, and library manager 160. Data storage devices 130 and 140, and library manager 160, are disposed within one or more data storage and retrieval systems, such as data storage and retrieval systems 100 (FIG. 1)/200 (FIG. 2). In certain embodiments, DASD 310 is integral with host 390. In certain embodiments, DASD 310 is integral with VTS 300. In certain embodiments, DASD 310 is integral with a data storage and retrieval system. In certain embodiments, DASD 310 is external to host 390, VTS 300, and the one or more data storage and retrieval systems in communication with VTS 300. In the embodiment of FIG. 3, library manager 160 communicates with data storage devices 130 and 140. In alternative embodiments, library manager 160 does not directly communicate with data storage devices 130/140.

VTS 300 further includes storage manager 320, such as the IBM Adstar® Distributed Storage Manager. Storage manager 320 controls the movement of data from DASD 310 to information storage media mounted in data storage devices 130 and 140. In certain embodiments, storage manager 320 includes an ADSM server 322 and an ADSM hierarchical storage manager client 324. Alternatively, server 322 and client 324 could each comprise an ADSM system. Information from DASD 310 is provided to data storage devices 130 and 140 via ADSM server 322 and SCSI adapter 385.

VTS 300 further includes autonomic controller 350. Autonomic controller 350 controls the operations of DASD 310, and the transfer of data between DASD 310 and data storage devices 130 and 140. Library manager 160 communicates with autonomic controller 350. In certain embodiments, controller 350 includes a computer useable medium 352 having computer readable program code 354 disposed therein for implementing Applicants' method to enable and disable data compression by one or more information storage devices. In certain embodiments, controller 350 includes program code 354 stored in one or more memory devices, such as a magnetic disk, a magnetic tape, electronic storage medium, optical storage medium, or other non-volatile memory device, and combinations thereof.

Data storage devices 130 and 140 contain one or more data compression algorithms. In certain embodiments, devices 130/140 are capable of data compression having a data compression ratio of about 4:1. In certain embodiments, devices 130/140 are capable of data compression having a data compression ratio greater than about 4:1.

From the host computer 390 perspective, device daemons 370, 372, and 374 appear to comprise multiple information storage devices attached to host adapters 302/304. Information is communicated between DASD 310 and host 390 via storage manager 320 and one or more of device daemons 370, 372, and 374.

Host computer 390 comprises a computer system, such as a mainframe, personal computer, workstation, etc., including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 390 includes a storage management program 394 (not shown in FIG. 3). The storage management program 394 in the host computer 390 may include the functionality of storage management type programs known in the art that manage the transfer of data to a data storage and retrieval system, such as the IBM DFSMS implemented in the IBM MVS operating system.

The IBM DFSMS software is described in "z/OS V1R3 DFSMS Introduction," IBM document no. SC26-7397-01, which document is incorporated herein by reference in its entirety. Storage management program 394 may include known storage management program functions, such as recall and migration. The storage management program 394 may be implemented within the operating system of the host computer 390 or as a separate, installed application program. Alternatively, storage management program 394 may include device drivers, backup software, and the like.

Figure 1:
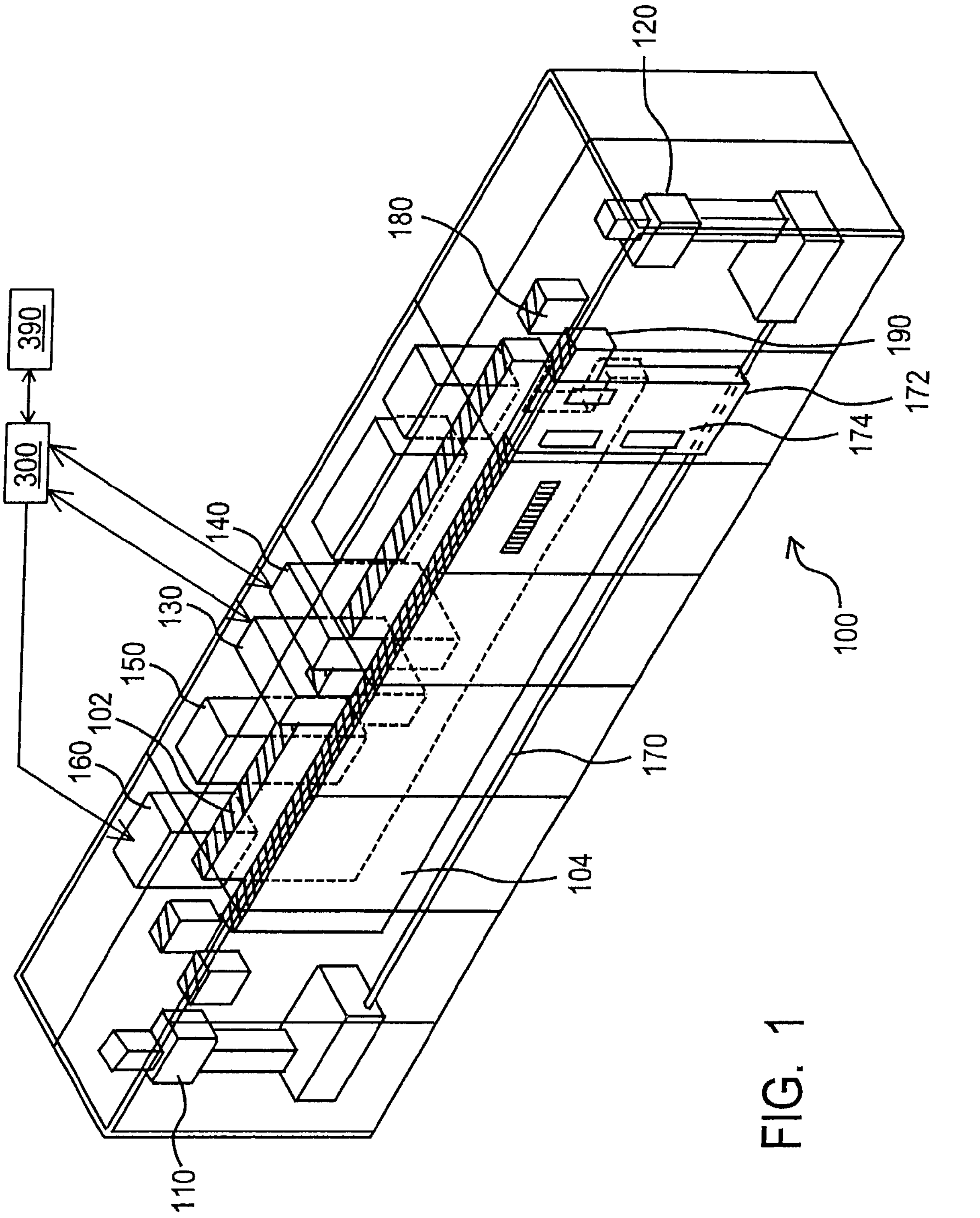
FIG. 1 is a perspective view of a first embodiment of Applicant's data storage and retrieval system.
Figure 2:
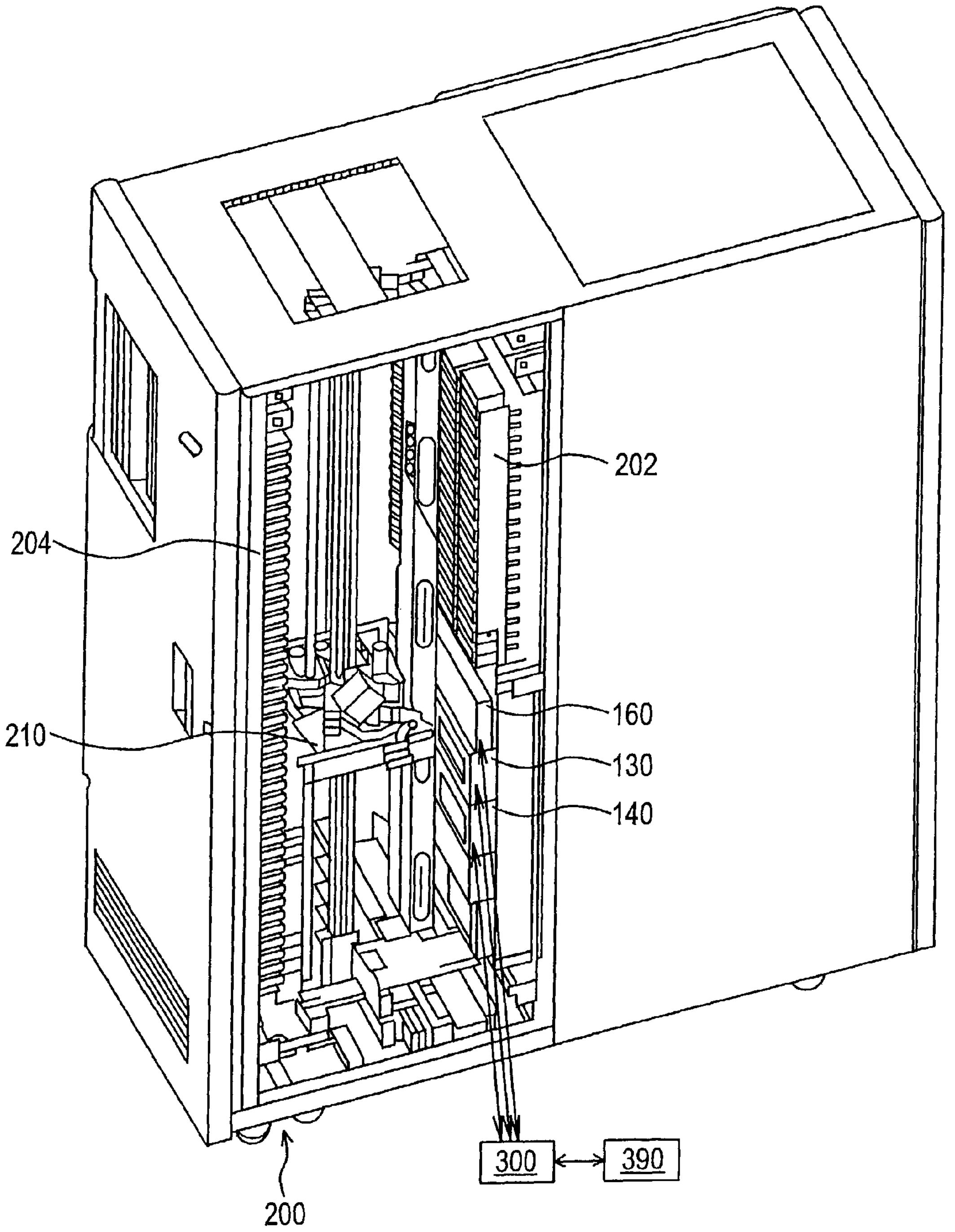
FIG. 2 is a perspective view of a second embodiment of Applicant's data storage and retrieval system.

Referring now to FIG. 1, automated data storage and retrieval system 100 is shown having a first wall of storage slots 102 and a second wall of storage slots 104. Portable data storage media are individually stored in these storage slots. In certain embodiments, such data storage media are individually housed in portable container, i.e. a cartridge. Examples of such data storage media include magnetic tapes, magnetic disks of various types, optical disks of various types, electronic storage media, and the like.

Applicant's automated data storage and retrieval system includes one or more accessors, such as accessors 110 and 120. An accessor is a robotic device which accesses portable data storage media from first storage wall 102 or second storage wall 104, transports that accessed media to data storage devices 130/140 for reading and/or writing data thereon, and returns the media to a proper storage slot. In certain embodiments, data storage devices 130 (FIGS. 1, 2, 3) and 140 (FIGS. 1, 2, 3) comprise IBM TotalStorage™ 3590 tape drives and the portable information storage media comprise magnetic tapes housed in IBM TotalStorage™ 3590 tape cartridges. TotalStorage is a trademark of the IBM corporation.

Device 160 comprises a library manager. In certain of these embodiments, library controller 160 is integral with a computer. Operator input station 150 permits a user to communicate with Applicant's automated data storage and retrieval system 100. Power component 180 and power component 190 each comprise one or more power supply units which supply power to the individual components disposed within Applicant's automated data storage and retrieval system. Import/export station 172 includes access door 174 pivotably attached to the side of system 100. Portable data storage cartridges can be placed in the system, or in the alternative, removed from the system, via station 172/access door 174.

FIG. 2 shows system 200 which comprises another embodiment of Applicant's data storage and retrieval system. System 200 includes first storage wall 202 and second storage wall 204. Storage walls 202 and 204 each include a plurality of storage elements in which can be stored a plurality of portable data storage media. System 200 includes two or more data storage devices, such as devices 130 and 140. Data storage device 130/140 each comprise a floppy disk drive, an optical disk drive, a magnetic tape drive, an electronic media drive, and the like. System 200 further includes controller 160. System 200 further includes an operator control panel (not shown in FIG. 2).

System 200 further includes one or a plurality of portable data storage cartridges located in one or more slots in storage walls 202/204. Each such cartridge contains a data storage medium located therein. Such data storage media includes optical media, magnetic media, tape media, electronic media, and combinations thereof.

System 200 also includes at least one robotic accessor 210 for transporting a designated portable data storage medium between a storage slot disposed in first wall 202 or second wall 204 and data storage device 130/140.

Referring again to FIG. 3, virtual volumes that are recently accessed by host 390 are maintained in DASD 310. Therefore, at any given time a plurality of virtual volumes are stored in DASD 310. Virtual volumes that are less recently accessed may be written to one or more second information storage media using data storage devices 130/140. Such second information storage media include magnetic storage media, optical storage media, electronic storage media, and combinations thereof.

Figure 4:
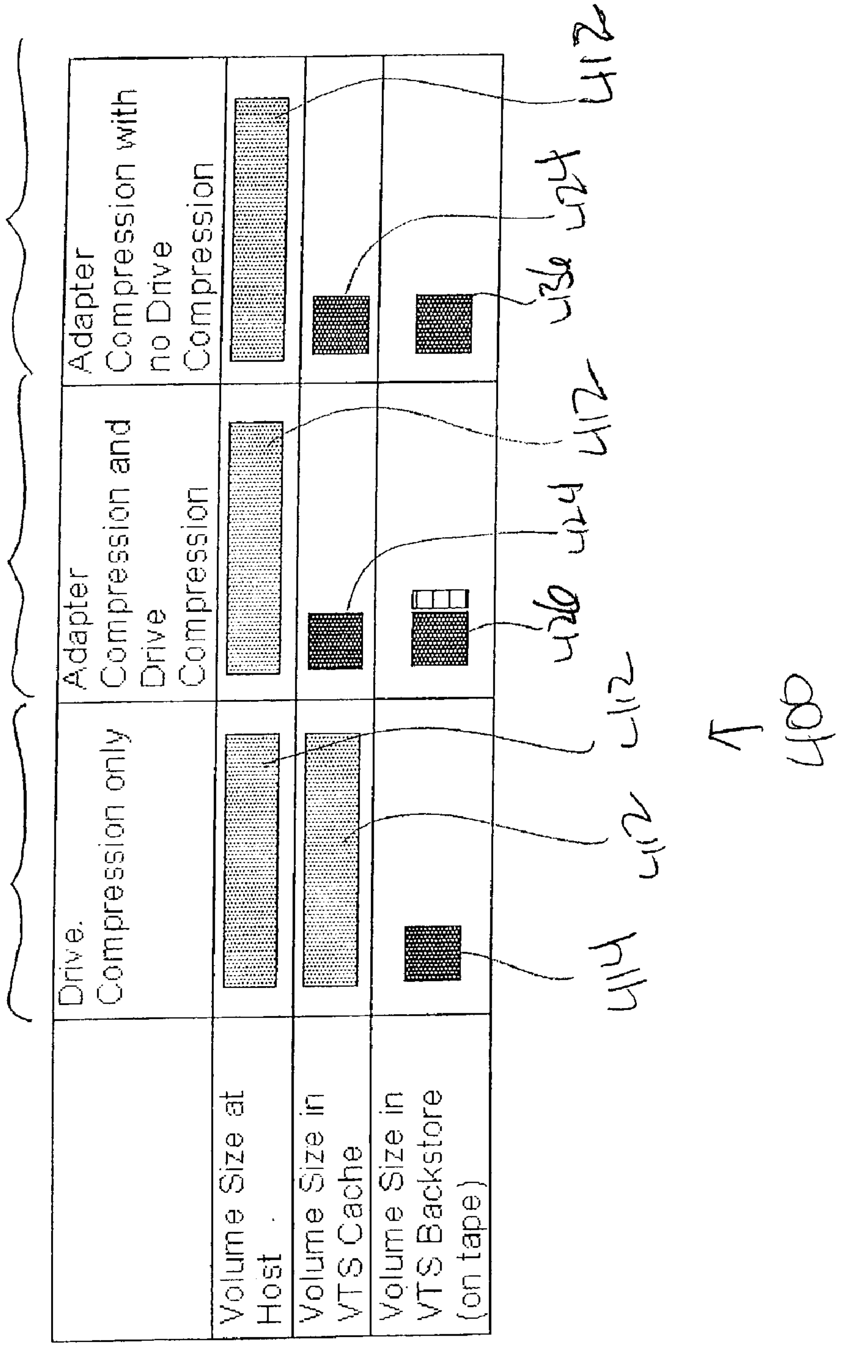
FIG. 4 shows the size of a logical volume at a host computer, in a data cache disposed in a virtual tape system, and as written to an information storage medium.

A logical volume is transmitted to VTS 300 by host 390 as uncompressed data, i.e. first information. Referring to FIG. 4, table 400 graphically depicts the relative sizes of such a logical volume using various data compression embodiments. Column 410 shows the relative sizes of a logical volume as received by the VTS from a host, as stored in the VTS data cache, and as written by an information storage device, where only storage device data compression is used. Logical volume 412 comprises uncompressed data, i.e. first information, received from a host computer. In a storage device data compression only embodiment, logical volume 412 is not compressed by the receiving host adapter in the VTS, such as host adapter 302 for example. This being the case, logical volume 412 is stored in the VTS cache, such as cache 310, as received. Thereafter, logical volume 412 is compressed to logical volume 414 when written by an information storage device using a data compression algorithm.

Column 430 shows the relatives sizes of a logical volume as received by the VTS from a host, as stored in the VTS data cache, and as written by a data storage device, where only host adapter data compression is used. Logical volume 412 comprises uncompressed data, i.e. first information, received from a host computer. In a host adapter compression only embodiment, logical volume 412 is compressed to logical volume 424, i.e. second information, by the receiving host adapter in the VTS, such as host adapter 302 for example. Logical volume 424 is stored in the VTS cache. Thereafter in this embodiment, logical volume 436 is written by an information storage device without using data compression.

Column 420 shows the relatives sizes of a logical volume as received by the VTS from a host, as stored in the VTS data cache, and as written by a data storage device, where both host adapter data compression and information storage device data compression are used. Logical volume 412 comprises uncompressed data, i.e. first information, received from a host computer. In this embodiment, logical volume 412 is compressed to logical volume 424, i.e. second information, by the receiving host adapter in the VTS. Logical volume 424 is stored in the VTS cache. Thereafter, logical volume 426, i.e. third information, is written by the data storage device again using data compression. In this "double compression" embodiment, logical volume 426, i.e. the twice-compressed volume, is larger than logical volume 436, i.e. the once-compressed volume. In certain embodiments, logical volume 426 is about ten percent larger than logical volume 436.

Because volume 426 is larger than volume 436, using both host adapter data compression and storage device data compression is not optimal. Such double compression results in increased storage requirements and decreased throughput when writing an already-compressed volume again using data compression. It might appear that if host adapter data compression is available, then storage device data compression should always be disabled.

Figure 5:
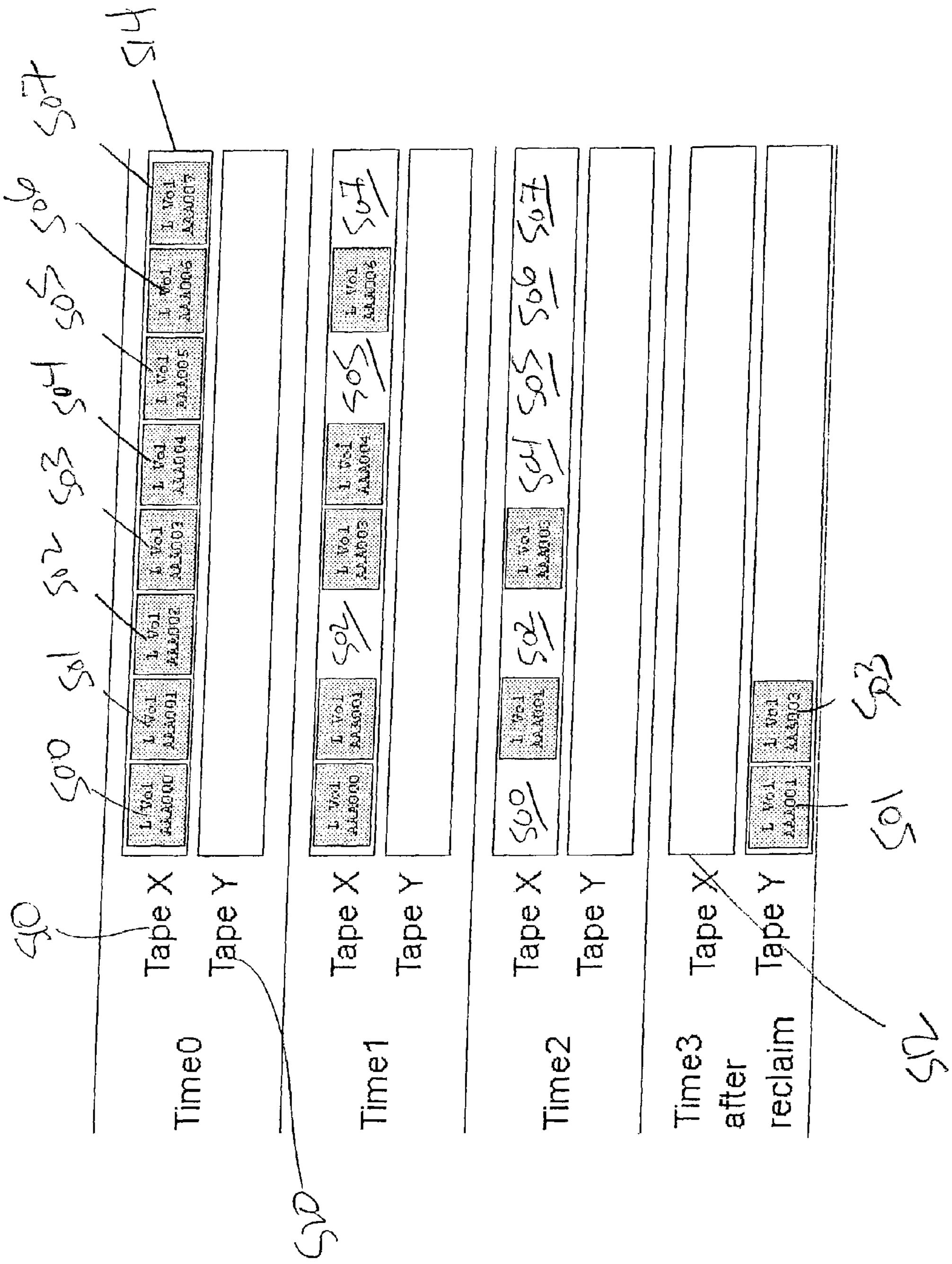
FIG. 5 depicts a plurality of logical volumes written to two data storage media.

Applicants have found, however, that it is not always advantageous to disable drive compression in a VTS comprising compression-capable host adapters. When "reclaiming" an tape storage medium, decreased VTS performance can result if information storage device data compression is disabled even if the VTS includes compression-capable host adapters. FIG. 5 illustrates the reclamation process.

Referring now to FIG. 5, at time T0 storage medium 510, i.e. Tape X, comprises a plurality of logical volumes including volumes 500, 501, 502, 503, 504, 505, 506, and 507. For illustrative purposes, FIG. 5 shows Tape X comprising eight (8) logical volumes, with logical volume 507 ending at end of tape 514. In certain embodiments, end of tape 514 comprises a physical end of the tape medium. In certain embodiments, end of tape 514 comprises a logical end of the tape medium. As those skilled in the art will appreciate, Tape X may comprise many thousands of individual files. Storage medium 520, i.e. Tape Y, comprises no data at time T0.

As those skilled in the art will appreciate, over time certain data, i.e. historical data, and certain volumes, i.e. historical volumes comprising that historical data, are superceded with new data and new volumes. Such historical volumes are rarely if ever accessed by host computers. Nonetheless, information storage media comprising those historical volumes remain stored in the data storage and retrieval system.

For example, at time T1 logical volumes 502, 505, and 507, have been superceded by new volumes. Thereafter, at time T2 logical volumes 500, 502, 504, 505, 506, and 507, have been superceded.

As those skilled in the art will further appreciate, writing information to a tape storage medium is not a "random access" process. Rather, in order to write new data to a tape medium, a tape drive first locates the end of the existing data, and then commences writing the new data. Therefore, even though volumes 500, 502, 504, 505, 506, and 507, do not contain useful information at time T2, it is generally not practical to overwrite just those superceded volumes with new information.

The "reclamation" process selectively copies the logical volumes comprising useable information, i.e. current information, such as logical volumes 501 and 503, from storage medium 510 to storage medium 520. At time T3, where T3 is subsequent to reclamation, volumes 501 and 503 have been copied from Tape X to Tape Y. Thereafter, new data may be written to Tape X commencing at beginning of tape 512. In certain embodiments, logical volumes 500 through 507, inclusive, are first erased from Tape X. In certain embodiments, logical volumes 500 through 507, inclusive, are overwritten with new information. In either embodiment, Tape X is said to have been "reclaimed." As FIG. 5 shows, the reclamation process "reclaims" Tape X in its entirety while the useful data, i.e. logical volumes 501 and 503, require only a small portion of the available storage space on Tape Y.

Figure 6A:
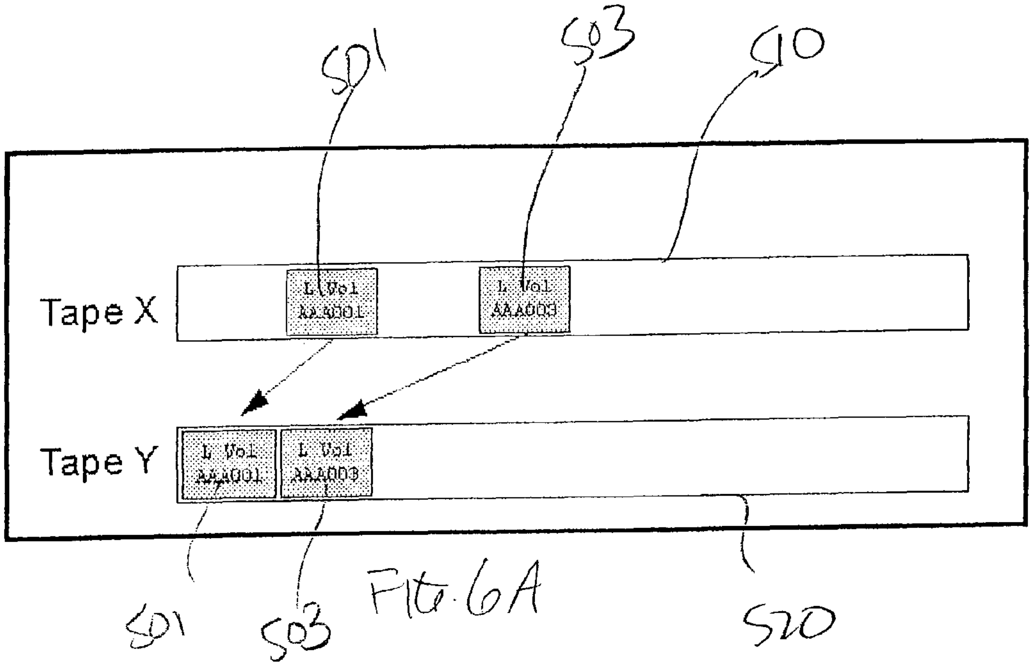
FIG. 6A illustrates a first embodiment of copying one or more logical volumes from a first information storage medium to a second information storage medium.

If tape drive data compression is not used in the reclamation process, the volumes copied from the source storage medium, i.e. storage medium 510, are written to the destination storage medium, i.e. storage medium 520, in the format in which that information was earlier provided to the historical tape drive writing that source medium. For example and referring to FIG. 6A and embodiments 720 and 730 shown in FIG. 7, if logical volume 601 was compressed by a host adapter to logical volume 501, then that compressed volume 501 was provided to the historical tape drive. In the reclamation process logical volume 501 is written to the destination storage medium even if tape drive data compression is not used during reclamation. Embodiments 720 and 730 both utilize host adapter data compression. Therefore, in these embodiments, compressed volume 501 is stored in the VTS cache, and later provided to the historical storage device. This being the case, in the reclamation process volume 501 is written to the destination storage medium even if storage device data compression is not used.

Figure 6B:
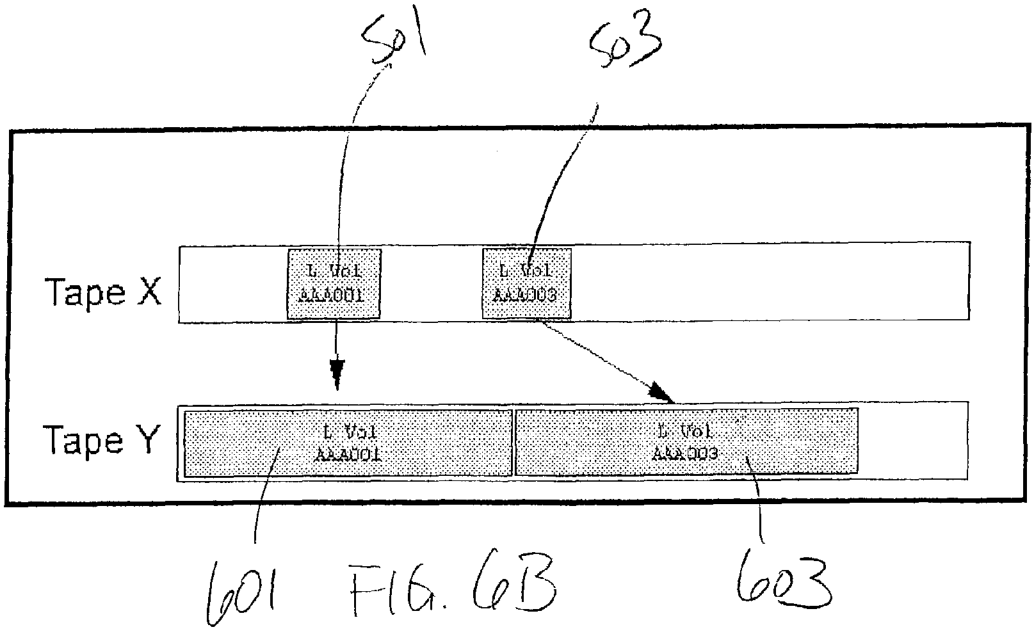
FIG. 6B illustrates a second embodiment of copying one or more logical volumes from a first information storage medium to a second information storage medium.
Figure 7:
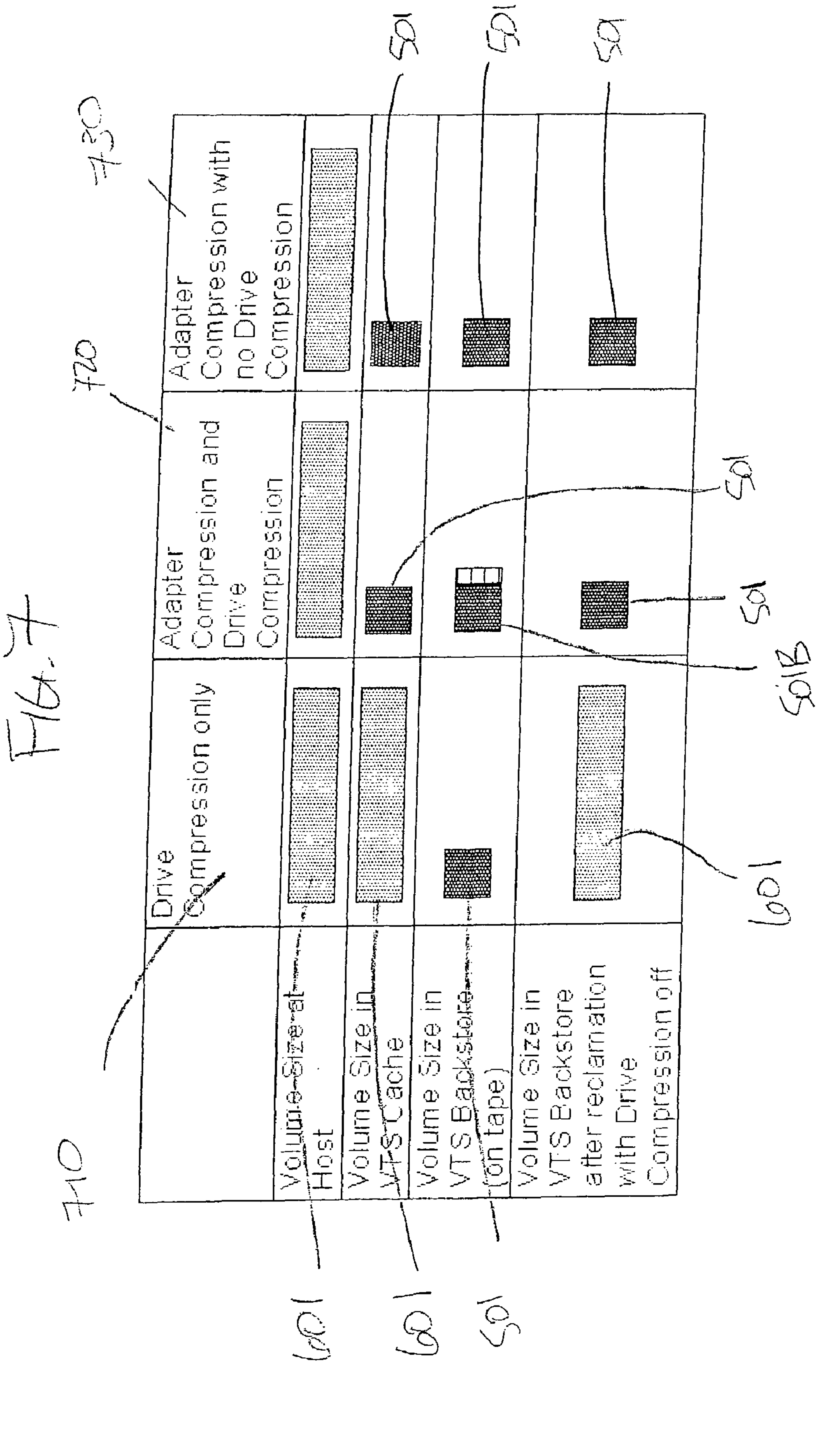
FIG. 7 illustrates the size of a logical volume using various embodiments of data compression.

Referring to FIG. 6B and embodiment 710 of FIG. 7, if host adapter data compression was not used when volume 601 was received from the host, then volume 601 was stored in the cache, and uncompressed volume 601 was provided to the historical storage device. That historical tape drive used one or more data compression algorithms to compress volume 601 to volume 501 and wrote volume 501 to Tape X. If tape drive data compression is not used during the reclamation process, uncompressed logical volume 601 rather than compressed volume 501 is written to the destination medium.

Thus if drive compression is not used during reclamation, a likelihood exists that the copied logical volumes, even though written to the source storage medium as compressed information, may be copied to the destination storage medium as uncompressed volumes. Such a reclamation procedure could be inefficient because of the increased processing time, and the additional storage space required on the destination storage medium. More significantly, such a reclamation process could be disadvantageous if insufficient destination storage medium space is available causing a shut down of the entire data storage and retrieval system.

Referring now to FIG. 8, Applicants' invention includes, beginning at step 805, a method to autonomically enable/disable storage device data compression in a data storage and retrieval system, such as virtual tape system 300 (FIG. 3). In certain embodiments, step 805 is performed each time the data storage and retrieval system is powered-up. In certain embodiments, step 805 is automatically performed on a regular time interval. In certain embodiments, such a time interval is selected from the group consisting of 30 days, 60 days, 90 days, 120 days, 180 days, and 365 days. In certain embodiments, these time interval is written in firmware disposed in the data storage and retrieval system controller, such as controller 160 (FIG. 1) and/or controller 350 (FIG. 3).

In certain embodiments, step 805 is performed by a host computer, such as host computer 390 (FIGS. 1, 2, 3). In certain embodiments, step 805 is performed by a controller disposed in the data storage and retrieval system, such as controller 160 (FIGS. 1, 2) and/or controller 350 (FIG. 3). In certain embodiments, step 805 is performed by a user via an operator input workstation, such as operator input station 150 (FIG. 1).

Applicants' method transitions from step 805 to step 810 wherein Applicants' method determines if the data storage and retrieval system comprises data compressing host adapters, such as adapters 302 (FIG. 3)/304 (FIG. 3). In certain embodiments, step 810 is performed by a host computer, such as host computer 390 (FIGS. 1, 2, 3). In certain embodiments, step 810 is performed by a controller disposed in the data storage and retrieval system, such as controller 160 (FIGS. 1, 2) and/or controller 350 (FIG. 3).

If Applicants' method determines in step 810 that the data storage and retrieval system does not comprise data compressing host adapters, then Applicants' method transitions from step 810 to step 880 wherein Applicants' method enables the one or more data drives disposed in the data storage and retrieval system to write information using one or more data compression algorithms. In certain embodiments, Applicants' method transitions from step 880 to step 899 and ends. In certain embodiments, Applicants' method transitions from step 880 to step 885 wherein Applicants' method creates a data compression configuration file for the data storage and retrieval system, where that data compression configuration file enables data drive compression. Applicants' method transitions from step 885 to step 899 and ends.

If Applicants' method determines in step 810 that the data storage and retrieval system does comprise data compressing host adapters, then Applicants' method transitions from step 810 to step 820 wherein Applicants' method determines if the data storage and retrieval system contains a data compression configuration file. In certain embodiments, step 820 is performed by a host computer, such as host computer 390 (FIGS. 1, 2, 3). In certain embodiments, step 820 is performed by a controller disposed in the data storage and retrieval system, such as controller 160 (FIGS. 1, 2) and/or controller 350 (FIG. 3).

If Applicants' method determines in step 820 that the data storage and retrieval system does not contain a data compression configuration file, then Applicants' method transitions from step 820 to step 840. If Applicants' method determines in step 820 that the data storage and retrieval system does comprise a data compression configuration file, then Applicants' method transitions from step 820 to step 830, wherein Applicants' method determines if that configuration file disables data drive compression. In certain embodiments, step 830 is performed by a host computer, such as host computer 390 (FIGS. 1, 2, 3). In certain embodiments, step 830 is performed by a controller disposed in the data storage and retrieval system, such as controller 160 (FIGS. 1, 2) and/or controller 350 (FIG. 3).

If Applicants' method determines in step 830 that the data storage and retrieval system comprises a data compression configuration file that disables data drive compression, then Applicants' method transitions from step 830 to step 890 wherein Applicants' method disables data drive compression. In this embodiment, Applicants' method transitions from step 890 to step 899 and ends. If Applicants' method determines in step 830 that the data storage and retrieval system does not contain a data compression configuration file that disables data drive compression, then Applicants' method transitions from step 830 to step 840 wherein Applicant's method determines the number (N) of differing storage media types disposed in the data storage and retrieval system.

Applicants' method transitions from step 840 to step 850 wherein Applicants' method determines (N) storage medium usage thresholds, i.e. a threshold for each of the storage media types disposed in the data storage and retrieval system. In certain embodiments, step 840 is performed by a host computer, such as host computer 390 (FIGS. 1, 2, 3). In certain embodiments, step 840 is performed by a controller disposed in the data storage and retrieval system, such as controller 160 (FIGS. 1, 2) and/or controller 350 (FIG. 3). In certain embodiments, the (i)th storage medium usage threshold is based upon storage capacity of the (i)th type of information storage media disposed in the data storage and retrieval system, where (i) is greater than or equal to 1 and less than or equal to (N).

Figure 9:
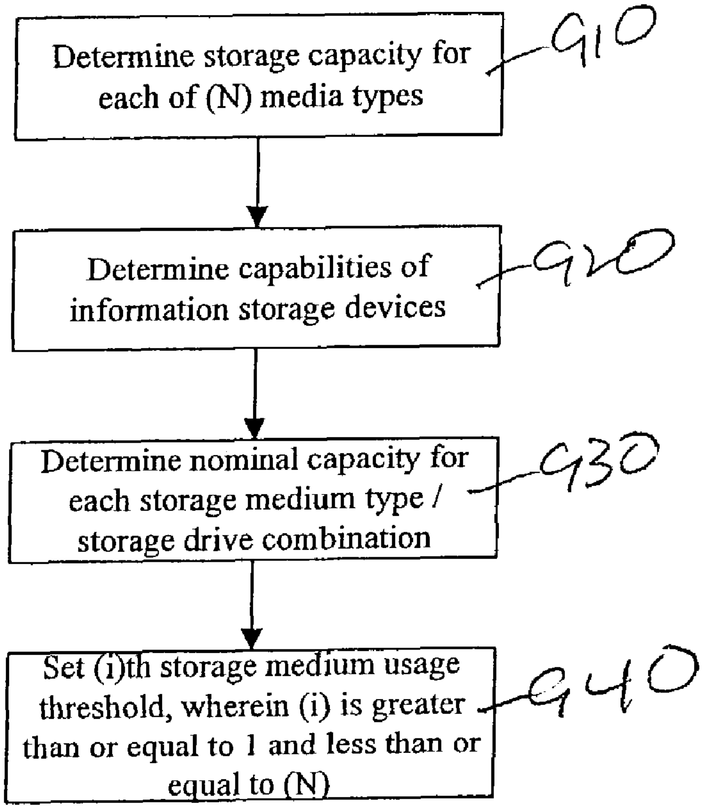
FIG. 9 summarizes certain additional steps of a second embodiment of Applicants' method to write information to one or more information storage media.

In certain embodiments, step 850 comprises the steps shown in FIG. 9. Referring now to FIG. 9, in step 910 Applicants' method determines the information storage capacity for each of the (N) differing information storage media disposed in the data storage and retrieval system. In certain embodiments, step 910 is performed by a host computer, such as host computer 390 (FIGS. 1, 2, 3). In certain embodiments, step 910 is performed by a controller disposed in the data storage and retrieval system, such as controller 160 (FIGS. 1, 2) and/or controller 350 (FIG. 3). In certain embodiments, these media storage types include, without limitation, one or more tape cartridge devices known in the art, such as ECCST, Magstar, TotalStorage® 3420, 3480, 3490E, 3580, 3590 tape cartridges, etc.

In step 920, Applicants' method determines the capacities of the one or more information storage devices, such as information storage device 130 (FIGS. 1, 2, 3) and information storage device 140 (FIGS. 1, 2, 3). In certain embodiments, step 920 is performed by a host computer, such as host computer 390 (FIGS. 1, 2, 3). In certain embodiments, step 920 is performed by a controller disposed in the data storage and retrieval system, such as controller 160 (FIGS. 1, 2) and/or controller 350 (FIG. 3). In certain embodiments, these one or more data storage devices include, without limitation, one or more TotalStorage® 3590 tape drives. In step 930, Applicants' method uses the information of steps 910 and 920 to determine the nominal storage capacity for each available information storage medium/data storage device combination.

In step 940, Applicants' method sets (N) storage medium usage thresholds using the information of step 930. In certain embodiments, step 940 is performed by a host computer, such as host computer 390 (FIGS. 1, 2, 3). In certain embodiments, step 940 is performed by a controller disposed in the data storage and retrieval system, such as controller 160 (FIGS. 1, 2) and/or controller 350 (FIG. 3). In certain embodiments, the (i)th storage medium usage threshold comprises the average quantity of information that can be written by the information storage devices disposed in the data storage and retrieval system to the (i)th information storage media type.

Referring again to FIG. 8, in step 860 Applicants' method determines (N) actual usage levels, i.e. an actual usage level for each of the storage media types disposed in the data storage and retrieval system. In certain embodiments, step 860 is performed by a host computer, such as host computer 390 (FIGS. 1, 2, 3). In certain embodiments, step 860 is performed by a controller disposed in the data storage and retrieval system, such as controller 160 (FIGS. 1, 2) and/or controller 350 (FIG. 3). In certain embodiments, step 860 includes examining each individual information storage medium disposed in the data storage and retrieval system to determine the (N) actual usage levels. In certain embodiments, step 860 further includes using a statistical model to analyze the information derived from such an examination of each individual information storage medium disposed in the data storage and retrieval system.

Figure 10:
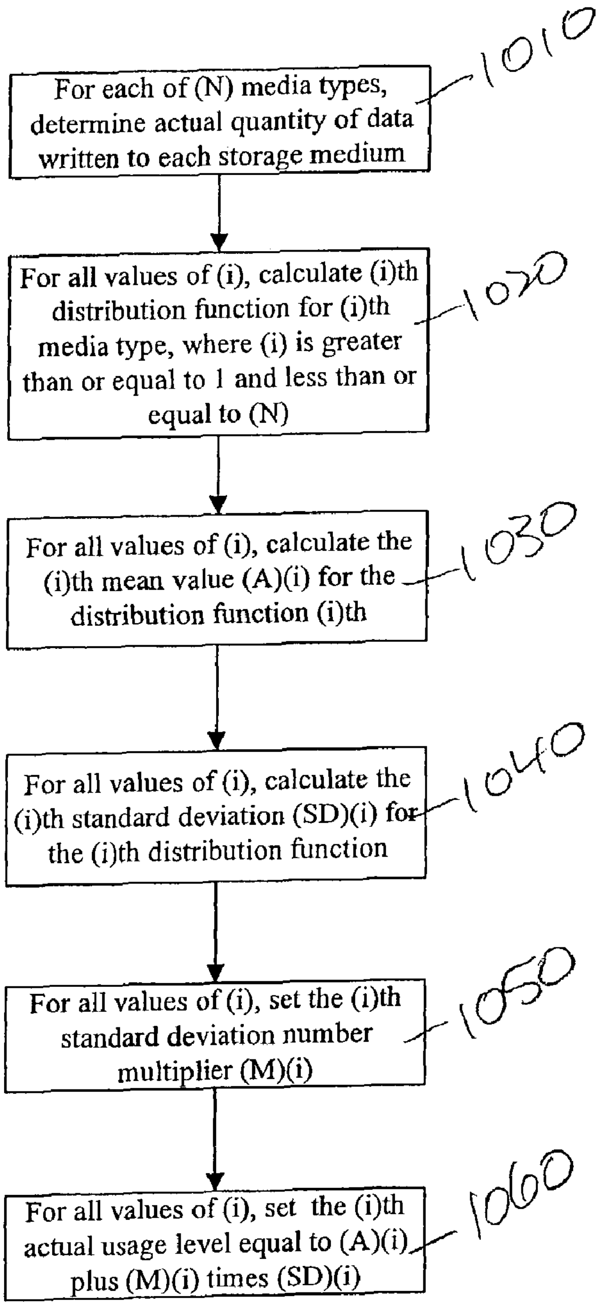
FIG. 10 summarizes certain additional steps of a third embodiment of Applicants' method to write information to one or more information storage media.

In certain embodiments, step 860 includes the steps recited in FIG. 10. Referring now to FIG. 10, in step 1010 Applicants' method determines, for each of the (N) media types, the actual quantity of information written to each storage medium disposed in the data storage and retrieval system. In certain embodiments, step 1010 is performed by a host computer, such as host computer 390 (FIGS. 1, 2, 3). In certain embodiments, step 1010 is performed by a controller disposed in the data storage and retrieval system, such as controller 160 (FIGS. 1, 2) and/or controller 350 (FIG. 3).

In step 1020, using the data of step 1010 Applicants' method calculates (N) distribution functions, i.e. a distribution function for each of the media types disposed in the data storage and retrieval system. In certain embodiments, step 1020 is performed by a host computer, such as host computer 390 (FIGS. 1, 2, 3). In certain embodiments, step 1020 is performed by a controller disposed in the data storage and retrieval system, such as controller 160 (FIGS. 1, 2) and/or controller 350 (FIG. 3).

Figure 12:
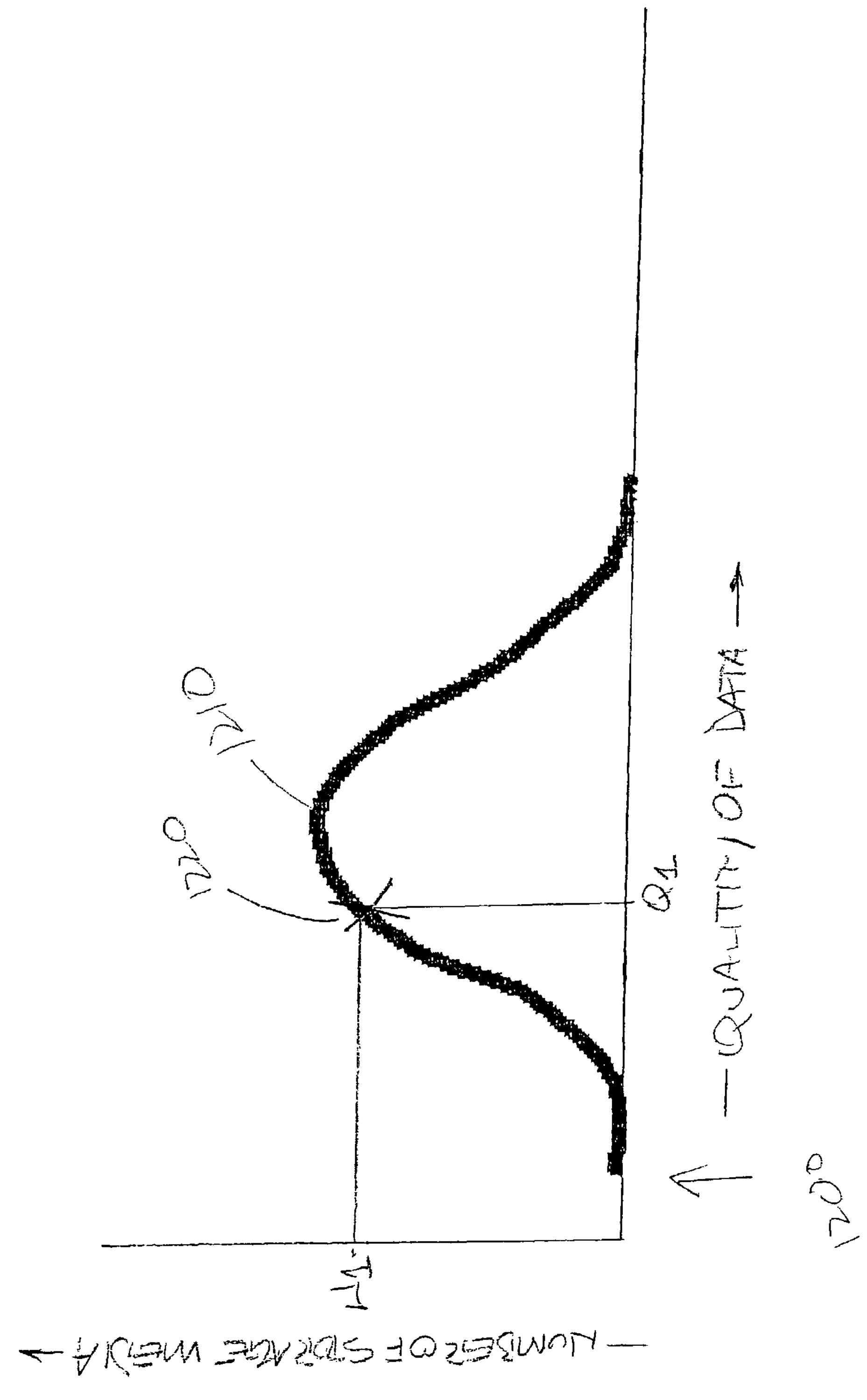
FIG. 12 graphically depicts a first distribution function for the quantity of data stored on a plurality of information storage media.

For example and referring to FIG. 12, graph 1200 shows such a distribution function for one of the media types disposed in a media library. The X axis of graph 1200 comprises the quantity of data written to each individual storage medium. The units for the Y axis comprise the number of storage media. Point 1220, for example, shows that a total of $N_1$ storage media comprise a quantity $Q_1$ of information. As those skilled in the art will appreciate, curve 1210 shows what is often referred to as a "normal distribution" of data. Such a normal distribution of data means that most of the examples in a set of data are close to the "average," while relatively few examples tend to one extreme or the other.

Referring again to FIG. 10, in step 1030, for each of the (N) media types, Applicants' method calculates the mean storage quantity (A) using the distribution function of step 1020. In certain embodiments, step 1030 is performed by a host computer, such as host computer 390 (FIGS. 1, 2, 3). In certain embodiments, step 1030 is performed by a controller disposed in the data storage and retrieval system, such as controller 160 (FIGS. 1, 2) and/or controller 350 (FIG. 3). In step 1040, Applicants' method calculates, for each of the (N) media types, the standard deviation (SD) for the distribution function of step 1020. In certain embodiments, step 1040 is performed by a host computer, such as host computer 390 (FIGS. 1, 2, 3). In certain embodiments, step 1040 is performed by a controller disposed in the data storage and retrieval system, such as controller 160 (FIGS. 1, 2) and/or controller 350 (FIG. 3).

As those skilled in the art will further appreciate, the standard deviation indicates how tightly all the data points of a distribution are clustered around the mean. When the data are tightly bunched together, i.e. the bell-shaped curve is steep, the standard deviation is small. When the data are spread apart and the bell curve is relatively flat, the standard deviation is larger.

In step 1050, Applicants' method selects, for each of the (N) media types, a standard deviation level multiplier (M). In certain embodiments, step 1050 is performed by a host computer, such as host computer 390 (FIGS. 1, 2, 3). In certain embodiments, step 1050 is performed by a controller disposed in the data storage and retrieval system, such as controller 160 (FIGS. 1, 2) and/or controller 350 (FIG. 3). As those skilled in the art will further appreciate, one standard deviation away from the mean in either direction, i.e. setting (M) equal to 1 in step 1050, includes about 68 percent of the data points in the distribution represented by curve 1210 (FIG. 12). Two standard deviations away from the mean, i.e. setting (M) at 2, account for roughly 95 percent of the data points comprising curve 1210. Three standard deviations, i.e. setting (M) at 3, account for greater than about 99 percent of the data points comprising curve 1210.

In certain embodiments, step 1050 includes setting (M) to 0. In these embodiments, the storage medium usage level threshold is set to the applicable value of (A). In certain embodiments, step 1050 includes setting (M) to about 2. In certain embodiments, step 1050 includes setting (M) to about 2.3. In certain embodiments, step 1050 includes setting (M) to greater than about 3.

Figure 13:
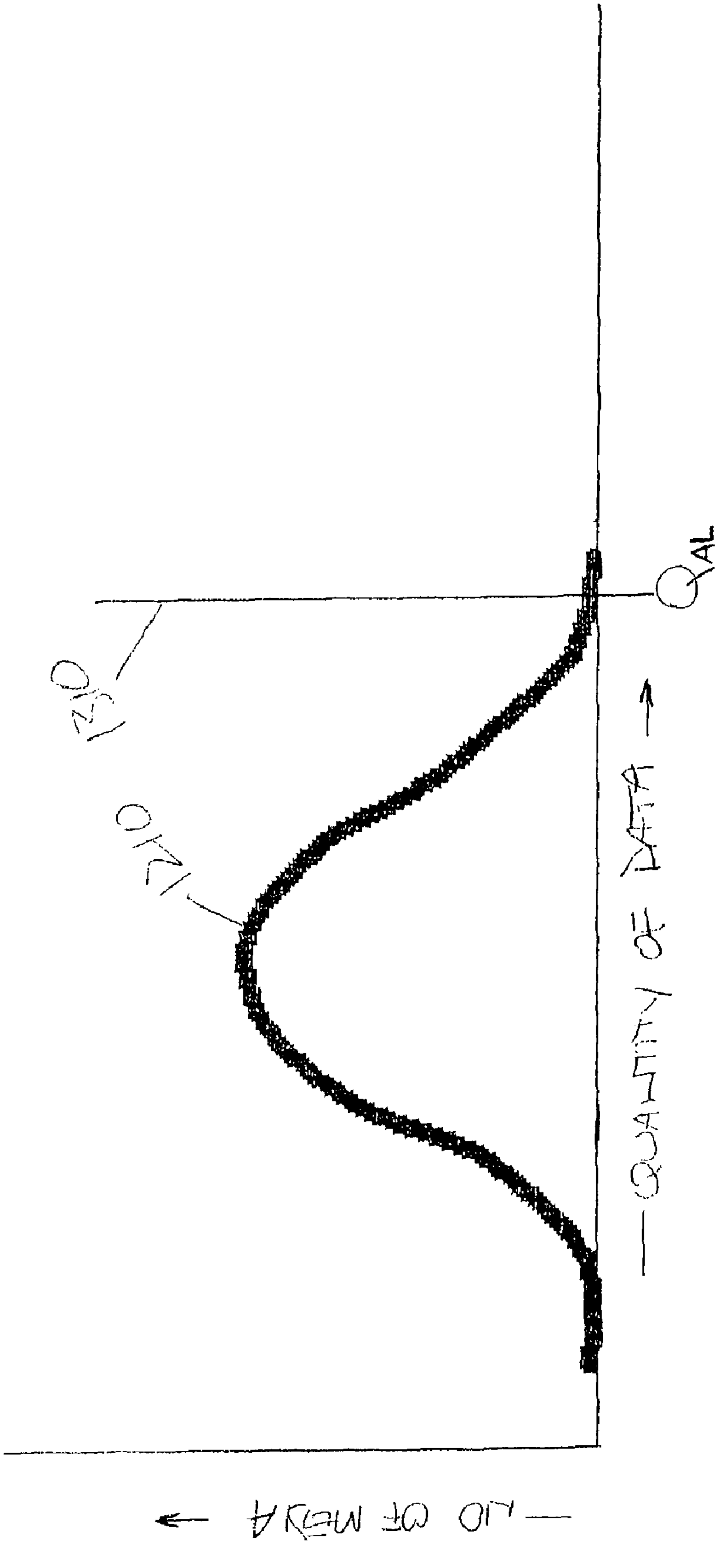
FIG. 13 graphically depicts the distribution function of FIG. 12 and the actual information usage level formed using that distribution function.

In step 1060, Applicants' method sets the (i)th actual storage medium usage level equal to (A)(i) plus the multiplication product of (M)(i) times (SD)(i). In certain embodiments, step 1060 is performed by a host computer, such as host computer 390 (FIGS. 1, 2, 3). In certain embodiments, step 1060 is performed by a controller disposed in the data storage and retrieval system, such as controller 160 (FIGS. 1, 2) and/or controller 350 (FIG. 3). Step 1060 includes setting (N) average storage medium usage levels. Referring now to FIG. 13, graph 1300 shows distribution function 1210 and curve 1310 representing the average storage medium usage level of step 860 (FIG. 8) shown as value $Q_{AL}$, where that average storage medium usage level is calculated in step 1060 with (M) is set to about 2.3 in step 1050.

Referring again to FIG. 8, in step 870 Applicants' method determines, for each of the (N) media types, if the applicable actual storage medium usage level determined in step 860 is greater than the applicable usage threshold determined in step 850 for that corresponding media type. In certain embodiments, step 870 is performed by a host computer, such as host computer 390 (FIGS. 1, 2, 3). In certain embodiments, step 870 is performed by a controller disposed in the data storage and retrieval system, such as controller 160 (FIGS. 1, 2) and/or controller 350 (FIG. 3). If Applicants' method determines in step 870 that the actual storage medium usage level of step 860, for any of the (N) media types, is greater than the corresponding usage threshold of step 850, then Applicants' method transitions from step 870 to step 880 and optionally through step 885.

If Applicants' method determines in step 870 that the applicable actual storage medium usage level of step 860 for each of the (N) media types is not greater than the corresponding usage threshold of step 850, then Applicants' method transitions from step 870 to step 875 wherein Applicants' method determines if individual storage media whose usage exceeds the threshold from step 850 will be individually analyzed. In certain embodiments, step 875 is performed by a host computer, such as host computer 390 (FIGS. 1, 2, 3). In certain embodiments, step 875 is performed by a controller disposed in the data storage and retrieval system, such as controller 160 (FIGS. 1, 2) and/or controller 350 (FIG. 3). If Applicants' method determines in step 875 that the individual storage media will not be individually analyzed, then Applicants' method transitions from step 875 to step 890, optionally to step 895, and to step 899 and ends.

Figure 14:
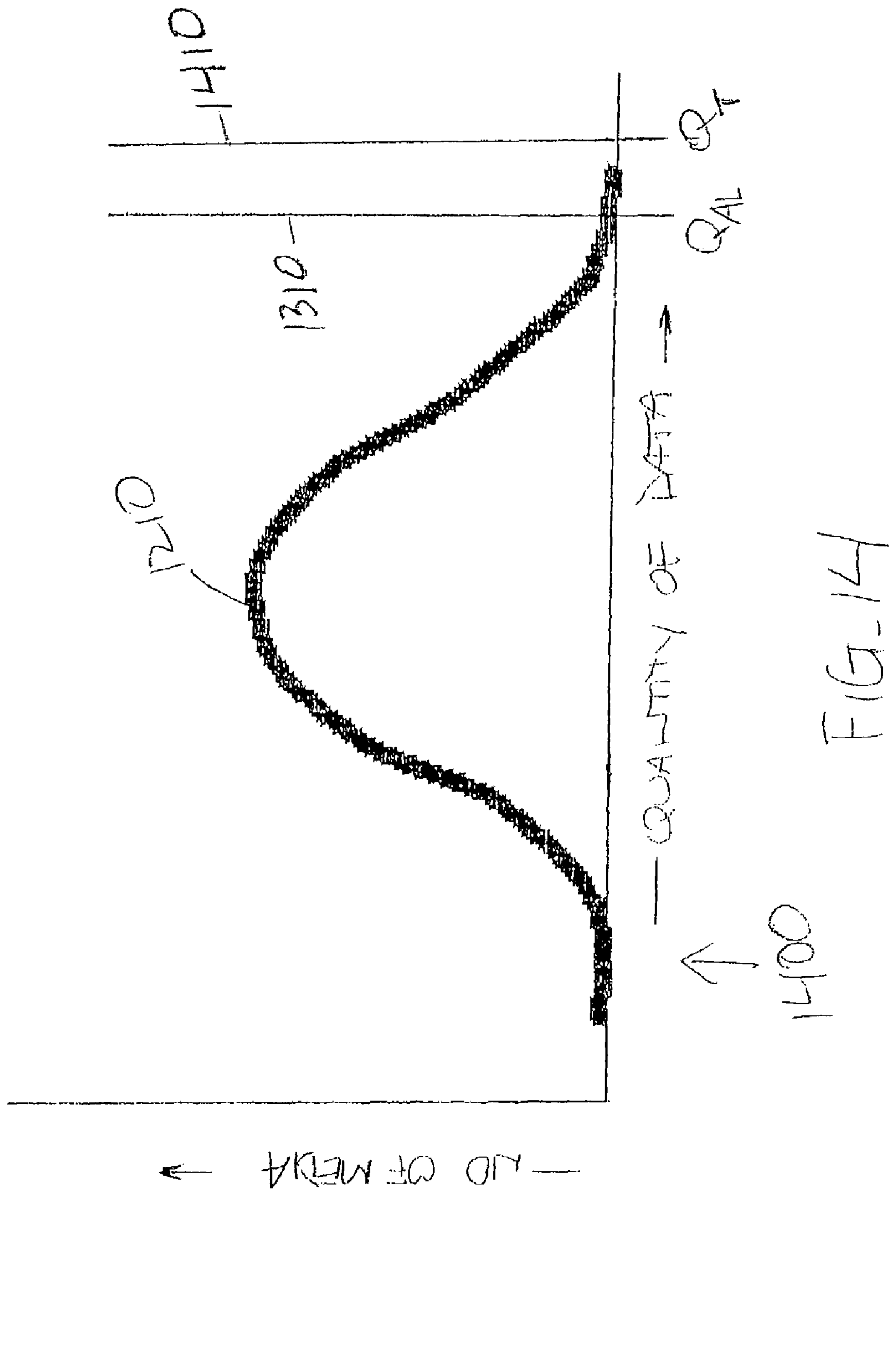
FIG. 14 graphically depicts the distribution function of FIG. 12, the actual information usage level of FIG. 13, and an information storage threshold level determined using Applicants' method.

For example and referring to FIG. 14, graph 1400 shows curve 1210 comprising the distribution function of step 1020 (FIG. 10), curve 1310 representing the actual storage medium usage level of step 860 having value $Q_{AL}$, and curve 1410 representing the usage threshold of step 850 having value $Q_T$. In the illustrated embodiment of FIG. 14, Applicants' method would determine in step 870 (FIG. 8) that the actual storage medium usage level of step 860 is not greater than the usage threshold of step 850 for each of the one or more types of differing information media.

In the illustrated embodiment of FIG. 14 there exists little likelihood that disabling data drive compression during the reclamation process described above could require storage resources exceeding the information storage resources available in the VTS. This being the case, in the illustrated embodiment of FIG. 14, with the optional examination of individual storage medium not performed in step 875, Applicants' method transitions from step 870 to step 890 and disables data drive compression.

Figure 15:
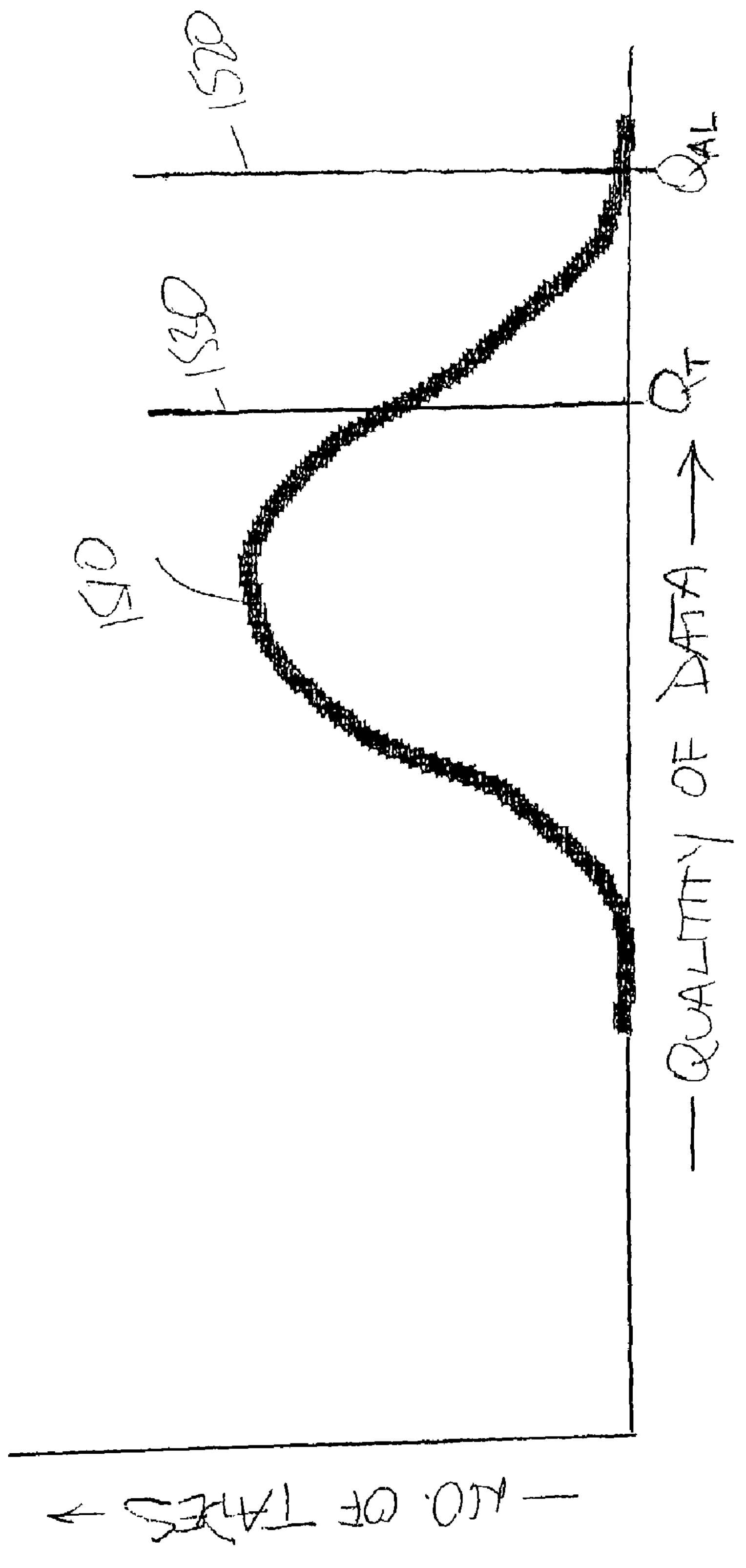
FIG. 15 graphically depicts a second distribution function, a second actual information usage level formed using the second distribution function of FIG. 14, and the information storage threshold level of FIG. 14.

Referring now to FIG. 15, graph 1500 shows curve 1510 representing a distribution function of step 1020 (FIG. 10), curve 1520 representing the actual storage medium usage level of step 860 having value $Q_{AL}$, and curve 1530 representing the usage threshold of step 850 having value $Q_T$. In the illustrated embodiment of FIG. 15, Applicants' method determines in step 870 (FIG. 8) that the actual average storage medium usage level of step 860 is greater than the usage threshold of step 850.

In the illustrated embodiment of FIG. 15 there exists an increased likelihood that disabling data drive compression in the reclamation process described above could require storage resources exceeding the information storage resources available in the VTS. Therefore in the illustrated embodiment of FIG. 15 Applicants' method transitions from step 870 to step 880 and enables data drive compression.

Figure 11A:
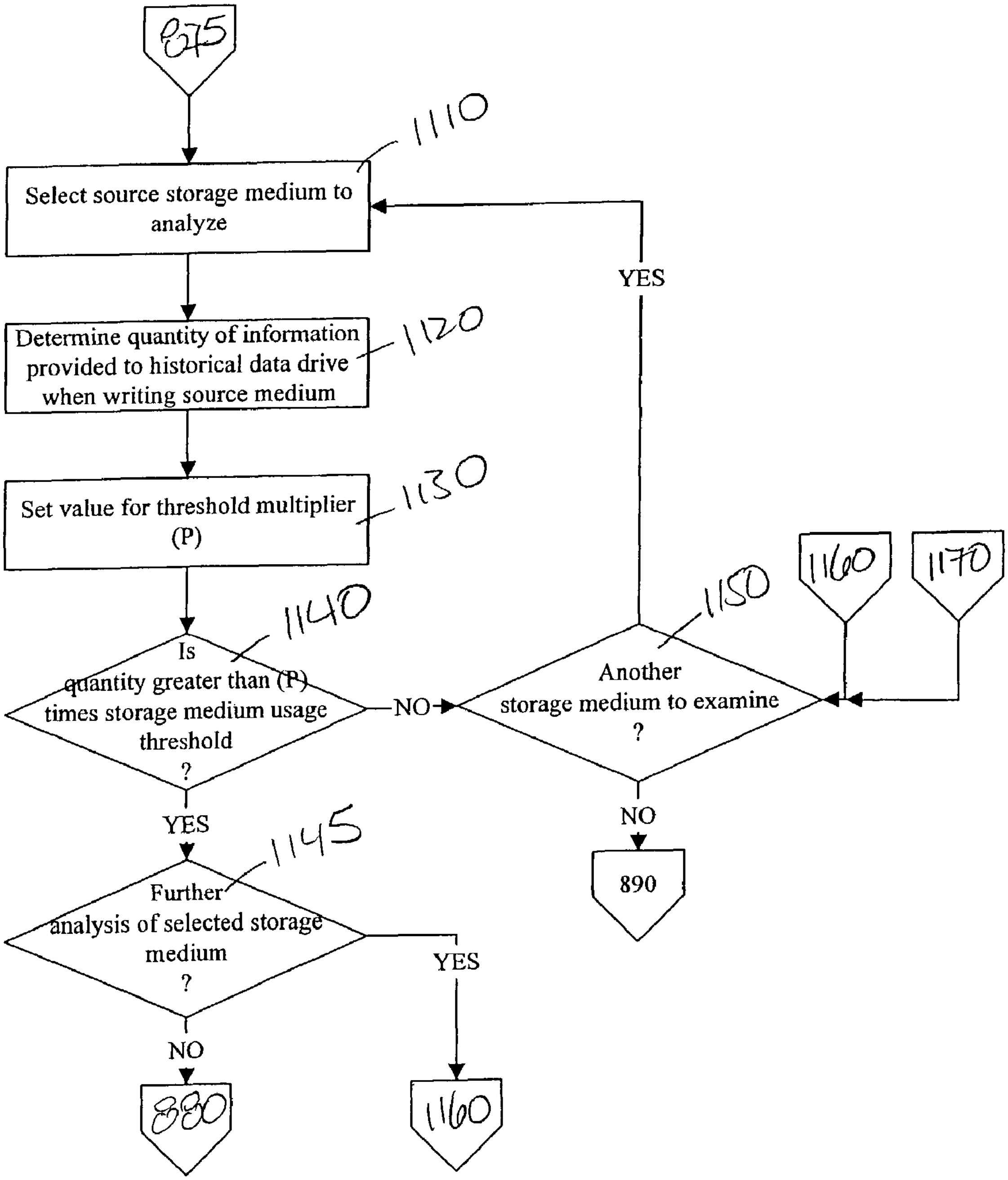
FIG. 11A summarizes certain additional steps of a fourth embodiment of Applicants' method to write information to one or more information storage media.
Figure 11B:
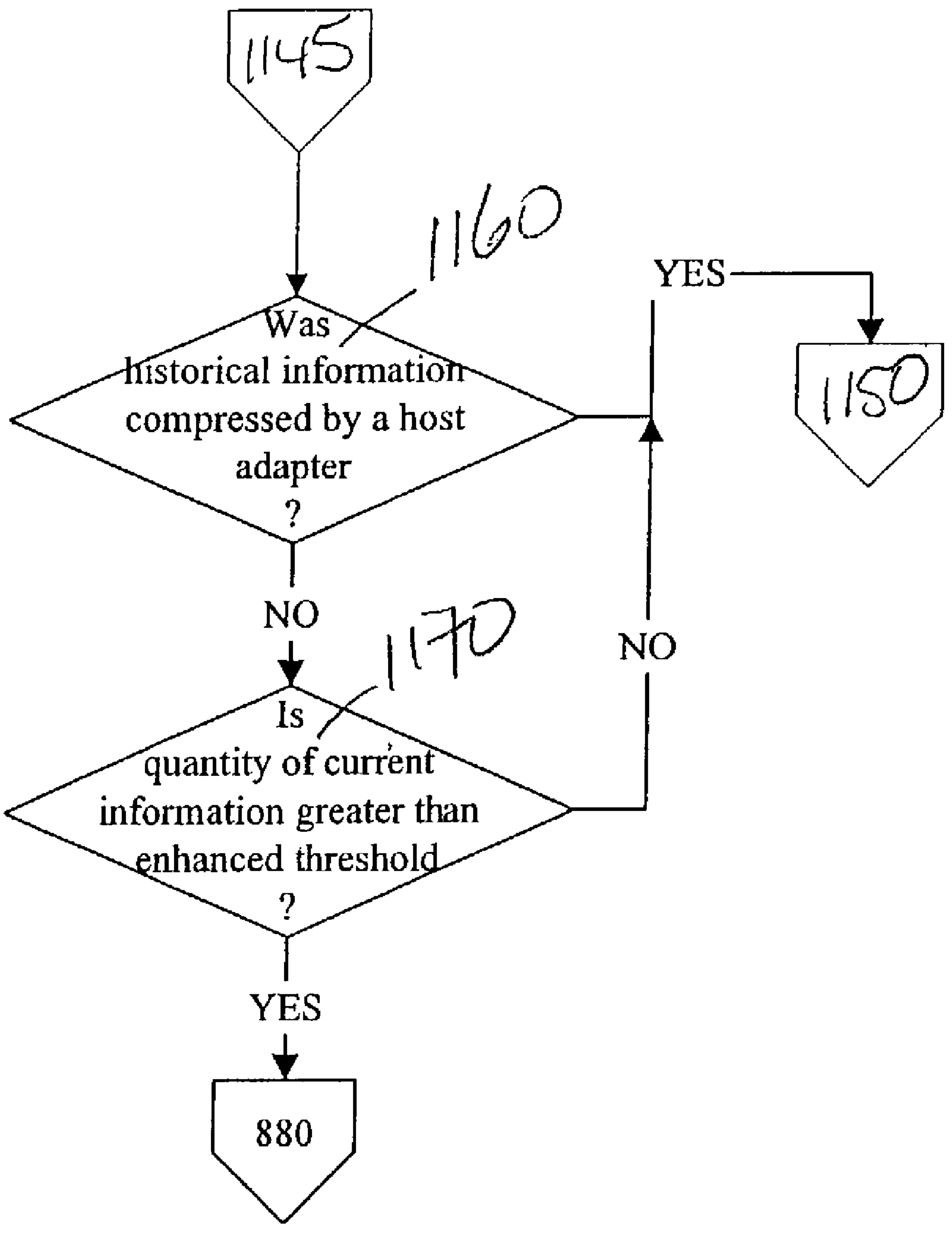
FIG. 11B summarizes certain additional steps of a fifth embodiment of Applicants' method to write information to one or more information storage media.

In the event Applicants' method determines in step 875 that individual storage media will be analyzed, then Applicants' method transitions from step 875 to step 1110 (FIG. 11A). Referring now to FIG. 11A, in step 1110 Applicants' method selects a storage medium to analyze. In certain embodiments, step 1110 is performed by a host computer, such as host computer 390 (FIGS. 1, 2, 3). In certain embodiments, step 1110 is performed by a controller disposed in the data storage and retrieval system, such as controller 160 (FIGS. 1, 2) and/or controller 350 (FIG. 3).

In step 1120, Applicants' method examines the medium selected in step 1110 and determines the quantity of information provided to the historical data device when the selected storage medium was written. In certain embodiments, step 1120 is performed by a host computer, such as host computer 390 (FIGS. 1, 2, 3). In certain embodiments, step 1120 is performed by a controller disposed in the data storage and retrieval system, such as controller 160 (FIGS. 1, 2) and/or controller 350 (FIG. 3).

In step 1130, Applicants' method sets a value for the medium usage level threshold multiplier (P). In certain embodiments, step 1130 is performed by a host computer, such as host computer 390 (FIGS. 1, 2, 3). In certain embodiments, step 1130 is performed by a controller disposed in the data storage and retrieval system, such as controller 160 (FIGS. 1, 2) and/or controller 350 (FIG. 3). In certain embodiments, (P) is set to about 5. In certain embodiments, (P) is set to less than 5. In certain embodiments, (P) is set to greater than 5. In the embodiment of FIG. 11A, Applicants' method sets a larger storage threshold by multiplying the threshold of step 850 by (P).

In step 1140, Applicants' method determines if that quantity of information determined in step 1120 is greater than (P) times the applicable storage medium usage threshold of step 850 (FIG. 8). This allows a small quantity of the volumes to exceed the storage medium usage threshold from step 850 by up to P times. This small quantity of volumes will require additional storage resources, but will be prevented from exceeding the information storage resources available in the data storage and retrieval system by proper selection of the value of (P). In certain embodiments, step 1140 is performed by a host computer, such as host computer 390 (FIGS. 1, 2, 3). In certain embodiments, step 1140 is performed by a controller disposed in the data storage and retrieval system, such as controller 160 (FIGS. 1, 2) and/or controller 350 (FIG. 3).

If Applicants' method determines in step 1140 that the quantity of information provided to the historical data device is not greater than P times the storage medium usage threshold, then Applicants' method transitions from step 1140 to step 1150. If Applicants' method determines in step 1140 that the quantity of information provided to the historical data device is greater than P times the storage medium usage threshold, then Applicants' method transitions from step 1140 to step 1145 wherein Applicants' method determines if the selected information storage medium will be further analyzed. If Applicants' method determines in step 1145 that the selected information storage medium will not be further examined, then Applicants' method transitions from step 1145 to step 880. In certain embodiments, step 1145 is performed by a host computer, such as host computer 390 (FIGS. 1, 2, 3). In certain embodiments, step 1145 is performed by a controller disposed in the data storage and retrieval system, such as controller 160 (FIGS. 1, 2) and/or controller 350 (FIG. 3).

Applicants' method determines in step 1145 that the selected information storage medium will be further examined, then Applicants' method transitions from step 1145 to step 1160 wherein Applicants' method determines if the historical information written to the selected medium was compressed using a host adapter. In certain embodiments, step 1160 is performed by a host computer, such as host computer 390 (FIGS. 1, 2, 3). In certain embodiments, step 1160 is performed by a controller disposed in the data storage and retrieval system, such as controller 160 (FIGS. 1, 2) and/or controller 350 (FIG. 3). If Applicants' method determines in step 1160 that the historical information was compressed using a host adapter, then Applicants' method transitions from step 1160 to step 1150.

If Applicants' method determines in step 1160 that the historical information was not compressed using a host adapter, then Applicants' method transitions from step 1160 to step 1170 wherein Applicants' method determines if the quantity of current information written to the selected information storage medium is greater than (P) times the applicable storage medium usage threshold of step 850. In certain embodiments, step 1170 is performed by a host computer, such as host computer 390 (FIGS. 1, 2, 3). In certain embodiments, step 1170 is performed by a controller disposed in the data storage and retrieval system, such as controller 160 (FIGS. 1, 2) and/or controller 350 (FIG. 3).

If Applicants' method determines in step 1170 that the quantity of current information written to the selected information storage medium is not greater than (P) times the applicable storage medium usage threshold of step 850, then Applicants' method transitions from step 1170 to step 1150. If Applicants' method determines in step 1170 that the quantity of current information written to the selected information storage medium is greater than (P) times the applicable storage medium usage threshold of step 850, then Applicants' method transitions from step 1170 to step 880 and then to step 899 and ends.

Referring again to FIG. 11A, in step 1150 Applicants' method determines if there are additional storage media to examine. In certain embodiments, step 1150 is performed by a host computer, such as host computer 390 (FIGS. 1, 2, 3). In certain embodiments, step 1150 is performed by a controller disposed in the data storage and retrieval system, such as controller 160 (FIGS. 1, 2) and/or controller 350 (FIG. 3). If Applicants' method determines in step 1150 that there are additional storage media to examine, then Applicants' method transitions from step 1150 to step 1110 and continues. Alternatively, if Applicants' method determines in step 1150 that there no additional storage media to examine, then Applicants' method transitions from step 1150 to step 890 and then to step 899 and ends.

The embodiments of Applicants' method recited in FIGS. 8, 9, 10, 11A, and/or 11B, may be implemented separately. Moreover, in certain embodiments, the individual steps recited in FIGS. 8, 9, 10, 11A, and/or 11B, may be combined, eliminated, or reordered.

Applicants' invention includes an article of manufacture comprising a computer useable medium having computer readable program code disposed therein for autonomically configuring a data storage and retrieval system to enable or disable data compression by the one or more data drives disposed in that virtual tape system. Applicants' invention further includes computer program products embodied as program code disposed therein for autonomically configuring a data storage and retrieval system to enable or disable data compression by the one or more data drives disposed in that virtual tape system. That program readable code may be stored in one or more memory devices, such as a magnetic disk, a magnetic tape, or other non-volatile memory devices.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to write information to one or more information storage media, comprising the steps of:

providing a virtual tape server comprising one or more host adapters comprising one or more data compression algorithms;

providing a data storage and storage and retrieval system comprising a data compression configuration file, one or more information storage media, and one or more information storage devices comprising one or more data compression algorithms, wherein said data storage and retrieval system is in communication with said virtual taper server;

determining if said data compression configuration file specifies disabling information storage device data compression;

operative if said data compression configuration file specifies disabling information storage device data compression, disabling use of information storage device data compression.

2. The method of claim 1, further comprising the steps of:

operative if said data compression configuration file does not specify disabling information storage device data compression, setting a storage medium usage threshold;

calculating an actual storage media usage level;

determining if said actual storage media usage level is greater than said storage medium usage threshold;

operative if said actual storage media usage level is greater than said storage medium usage threshold, enabling use of said one or more information storage device data compression algorithms;

operative if said actual storage media usage level is not greater than said storage medium usage threshold, disabling use of said one or more information storage device data compression algorithms.

3. The method of claim 1, wherein said setting step further comprises the steps of:

determining the storage capacity of each information storage medium disposed in said data storage and retrieval system;

determining the storage capability of each information storage device disposed in said data storage and retrieval system;

determining the nominal storage capacity for each storage medium/storage device combination.

4. The method of claim 1, wherein said data storage and retrieval system comprises two or more media types, further comprising the steps of:

determining the number (N) of media types disposed in said information storage and retrieval system;

for each of said (N) media types, setting a storage medium usage threshold;

for each of said (N) media types, calculating an actual storage media usage level;

determining for each of said (N) media types if said actual storage media usage level is greater than said storage medium usage threshold;

operative if the actual storage media usage level for any of the (N) media types is greater than the corresponding storage medium usage threshold, enabling use of said one or more data compression algorithms;

operative if the actual storage media usage level for each of the (N) media types is not greater than the corresponding storage medium usage threshold, disabling use of said one or more data compression algorithms.

5. The method of claim 4, wherein said calculating step further comprises the steps of:

for each of said (N) media types, determining the quantity of data written to each of said one or more information storage media;

for each of said (N) media types, calculating a distribution function;

for each of said (N) media types, calculating the mean value for said distribution function;

for each of said (N) media types, calculating the standard deviation for said distribution function;

for each of said (N) media types, setting a standard deviation level multiplier;

for each of said (N) media types, setting said actual storage media usage level equal to said mean plus the multiplication product of standard deviation times said standard deviation level.

6. The method of claim 5, further comprising the step of setting said (N) standard deviation level multipliers to about 2.3.

7. The method of claim 1, further comprising the steps of:

selecting an information storage medium written by a historical information storage device;

determining the quantity of information provided to said historical data storage device when writing said selected information storage medium;

setting an information medium usage threshold multiplier;

determining if said quantity of information is greater than the multiplication product of said information medium usage threshold times said information medium usage threshold multiplier;

operative if said quantity of information is greater than the multiplication product of said information medium usage threshold times said information medium usage threshold multiplier, enabling use of said one or more data compression algorithms;

operative if said quantity of information is not greater than the multiplication product of said information medium usage threshold times said information medium usage threshold multiplier, disabling use of said one or more data compression algorithms.

8. The method of claim 7, further comprising the steps of:

operative if said quantity of information is greater than the multiplication product of said information medium usage threshold times said information medium usage threshold multiplier, determining if said historical information was compressed using a host adapter;

operative if said historical information was compressed using a host adapter, disabling use of said one or more data compression algorithms.

9. The method of claim 7, wherein said information comprises current information and superseded information, further comprising the steps of:

determining the quantity of current information provided to said historical data drive when writing the source medium;

determining if said quantity of current information is greater than the multiplication product of said information medium usage threshold times said information medium usage threshold multiplier;

operative if said quantity of current information is greater than the multiplication product of said information medium usage threshold times said information medium usage threshold multiplier, enabling use of said one or more data compression algorithms;

operative if said quantity of information is not greater than the multiplication product of said information medium usage threshold times said information medium usage threshold multiplier, disabling use of said one or more data compression algorithms.

10. An article of manufacture comprising a computer useable medium having computer readable program code disposed therein to write information to one or more information storage media disposed in a data storage and retrieval system which includes a data compression configuration file and one or more information storage devices comprising one or more data compression algorithms, wherein said information storage and retrieval system is in communication with a virtual tape server comprising one or more host adapters comprising one or more data compression algorithms, the computer readable program code comprising a series of computer readable program steps to effect:

determining if said data compression configuration file specifies disabling information storage device data compression;

operative if said data compression configuration file specifies disabling information storage device data compression, disabling use of information storage device data compression.

11. The article of manufacture of claim 10, said computer readable program code further comprising a series of computer readable program steps to effect:

operative if said data compression configuration file does not specify disabling information storage device data compression, setting a storage medium usage threshold;

calculating an actual storage media usage level;

determining if said actual storage media usage level is greater than said storage medium usage threshold;

operative if said actual storage media usage level is greater than said storage medium usage threshold, enabling use of said one or more information storage device data compression algorithms;

operative if said actual storage media usage level is not greater than said storage medium usage threshold, disabling use of said one or more information storage device data compression algorithms.

12. The article of manufacture of claim 10, said computer readable program code further comprising a series of computer readable program steps to effect:

determining the storage capacity of each information storage medium disposed in said data storage and retrieval system;

determining the storage capability of each information storage device disposed in said data storage and retrieval system;

determining the nominal storage capacity for each storage medium/storage device combination.

13. The article of manufacture of claim 10, wherein said data storage and retrieval system comprises two or more media types, said computer readable program code further comprising a series of computer readable program steps to effect:

determining the number (N) of media types disposed in said information storage and retrieval system;

for each of said (N) media types, setting a storage medium usage threshold;

for each of said (N) media types, calculating an actual storage media usage level;

determining for each of said (N) media types if said actual storage media usage level is greater than said storage medium usage threshold;

operative if the actual storage media usage level for any of the (N) media types is greater than the corresponding storage medium usage threshold, enabling use of said one or more data compression algorithms;

operative if the actual storage media usage level for each of the (N) media types is not greater than the corresponding storage medium usage threshold, disabling use of said one or more data compression algorithms.

14. The article of manufacture of claim 13, said computer readable program code further comprising a series of computer readable program steps to effect:

for each of said (N) media types, determining the quantity of data written to each of said one or more information storage media;

for each of said (N) media types, calculating a distribution function;

for each of said (N) media types, calculating the mean value for said distribution function;

for each of said (N) media types, calculating the standard deviation for said distribution function;

for each of said (N) media types, setting a standard deviation level multiplier;

for each of said (N) media types, setting said actual storage media usage level equal to said mean plus the multiplication product of standard deviation times said standard deviation level.

15. The article of manufacture of claim 14, said computer readable program code further comprising a series of computer readable program steps to effect setting said (N) standard deviation level multipliers to about 2.3.

16. The article of manufacture of claim 10, wherein said data storage and retrieval system further comprises a source storage medium written by a historical information storage device and a destination storage medium, said computer readable program code further comprising a series of computer readable program steps to effect:

selecting an information storage medium written by a historical information storage device;

determining the quantity of information provided to said historical data storage device when writing said selected information storage medium;

setting an information medium usage threshold multiplier;

determining if said quantity of information is greater than the multiplication product of said information medium usage threshold times said information medium usage threshold multiplier;

operative if said quantity of information is greater than the multiplication product of said information medium usage threshold times said information medium usage threshold multiplier, enabling use of said one or more data compression algorithms;

operative if said quantity of information is not greater than the multiplication product of said information medium usage threshold times said information medium usage threshold multiplier, disabling use of said one or more data compression algorithms.

17. The article of manufacture of claim 16, said computer readable program code further comprising a series of computer readable program steps to effect:

operative if said quantity of information is greater than the multiplication product of said information medium usage threshold times said information medium usage threshold multiplier, determining if said historical information was compressed using a host adapter;

operative if said historical information was compressed using a host adapter, disabling use of said one or more data compression algorithms.

18. The article of manufacture of claim 16, wherein said information comprises current information and superseded information, said computer readable program code further comprising a series of computer readable program steps to effect:

determining the quantity of current information provided to said historical data drive when writing the source medium;

determining if said quantity of current information is greater than the multiplication product of said information medium usage threshold times said information medium usage threshold multiplier;

operative if said quantity of current information is greater than the multiplication product of said information medium usage threshold times said information medium usage threshold multiplier, enabling use of said one or more data compression algorithms;

operative if said quantity of information is not greater than the multiplication product of said information medium usage threshold times said information medium usage threshold multiplier, disabling use of said one or more data compression algorithms.

19. A computer program product usable with a programmable computer processor having computer readable program code embodied therein to write information to one or more information storage media disposed in a data storage and retrieval system which includes a data compression configuration file and one or more information storage devices comprising one or more data compression algorithms, wherein said information storage and retrieval system is in communication with a virtual tape server comprising one or more host adapters comprising one or more data compression algorithms, comprising:

computer readable program code which causes said programmable computer processor to determine if said data compression configuration file specifies disabling information storage device data compression;

computer readable program code which, if said data compression configuration file specifies disabling information storage device data compression, causes said programmable computer processor to disable use of information storage device data compression.

20. The computer program product of claim 19, further comprising:

computer readable program code which causes said programmable computer processor to calculate an actual storage media usage level for said one or more tape storage media;

computer readable program code which causes said programmable computer processor to determine if said actual storage media usage level is greater than said storage medium usage threshold;

computer readable program code which, if said actual storage media usage level is greater than said storage medium usage threshold, causes said programmable computer processor to enable use of said one or more information storage device data compression algorithms;

computer readable program code which, if said actual storage media usage level is not greater than said storage medium usage threshold, causes said programmable computer processor to disable use of said one or more information storage device data compression algorithms.

21. The computer program product of claim 19, further comprising:

computer readable program code which causes said programmable computer processor to determine the storage capacity of each information storage medium disposed in said data storage and retrieval system;

computer readable program code which causes said programmable computer processor to determine the storage capability of each information storage device disposed in said data storage and retrieval system;

computer readable program code which causes said programmable computer processor to determine the nominal storage capacity for each storage medium/storage device combination.

22. The computer program product of claim 19, further comprising:

computer readable program code which causes said programmable computer processor to determine the number (N) of media types disposed in said information storage and retrieval system;

computer readable program code which causes said programmable computer processor to set a storage medium usage threshold for each of said (N) media types;

computer readable program code which causes said programmable computer processor to calculate an actual storage media usage level for each of said (N) media types;

computer readable program code which causes said programmable computer processor to determine for each of said (N) media types if said actual storage media usage level is greater than said storage medium usage threshold;

computer readable program code which, if the actual storage media usage level for any of the (N) media types is greater than the corresponding storage medium usage threshold, causes said programmable computer processor to enable use of said one or more data compression algorithms;

computer readable program code which, if the actual storage media usage level for each of the (N) media types is not greater than the corresponding storage medium usage threshold, causes said programmable computer processor to disable use of said one or more data compression algorithms.

23. The computer program product of claim 22, further comprising:

computer readable program code which causes said programmable computer processor to determine for each of said (N) media types the quantity of data written to each of said one or more information storage media;

computer readable program code which causes said programmable computer processor to calculate the (i)th distribution function, wherein (i) is an integer greater than or equal to 1 and less than or equal to (N);

computer readable program code which causes said programmable computer processor to calculate the (i)th mean value for the (i)th distribution function;

computer readable program code which causes said programmable computer processor to calculate the (i)th standard deviation for the (i)th distribution function;

computer readable program code which causes said programmable computer processor to retrieve a pre-determined standard deviation level multiplier;

computer readable program code which causes said programmable computer processor to set the (i)th actual storage media usage level equal to the (i)th mean value plus the multiplication product of the (i)th standard deviation times the (i)th standard deviation level multiplier.

24. The computer program product of claim 23, further comprising:

computer readable program code which causes said programmable computer processor to set the (i)th standard deviation level multiplier to about 2.3 for all values of (i).

25. The computer program product of claim 19, further comprising:

computer readable program code which causes said programmable computer processor to select an information storage medium comprising information written by a historical information storage device;

computer readable program code which causes said programmable computer processor to determine the quantity of information provided to said historical data storage device when writing said selected information storage medium;

computer readable program code which causes said programmable computer processor to set an information medium usage threshold multiplier;

computer readable program code which causes said programmable computer processor to determine if said quantity of information is greater than the multiplication product of said information medium usage threshold times said information medium usage threshold multiplier;

computer readable program code which, if said quantity of information is greater than the multiplication product of said information medium usage threshold times said information medium usage threshold multiplier, causes said programmable computer processor to enable use of said one or more data compression algorithms;

computer readable program code which, if said quantity of information is not greater than the multiplication product of said information medium usage threshold times said information medium usage threshold multiplier, causes said programmable computer processor to disable use of said one or more information storage device data compression algorithms.

26. The computer program product of claim 25, further comprising:

computer readable program code which, if said quantity of information is greater than the multiplication product of said information medium usage threshold times said information medium usage threshold multiplier, causes said programmable computer processor to determine if said historical information was compressed using a host adapter;

computer readable program code which, if said historical information was compressed using a host adapter, causes said programmable computer processor to disable use of said one or more data compression algorithms.

27. The computer program product of claim 25, wherein said information comprises current information and superseded information, further comprising:

computer readable program code which causes said programmable computer processor to determine the quantity of current information provided to said historical data drive when writing the source medium;

computer readable program code which causes said programmable computer processor to determine if said quantity of current information is greater than the multiplication product of said information medium usage threshold times said information medium usage threshold multiplier;

computer readable program code which, if said quantity of current information is greater than the multiplication product of said information medium usage threshold times said information medium usage threshold multiplier, causes said programmable computer processor to enable use of said one or more data compression algorithms;

computer readable program code which, if said quantity of information is not greater than the multiplication product of said information medium usage threshold times said information medium usage threshold multiplier, causes said programmable computer processor to disable use of said one or more data compression algorithms.

* * * * *